United States Patent
Hayashi

(10) Patent No.: US 11,228,258 B2
(45) Date of Patent: Jan. 18, 2022

(54) UNINTERRUPTIBLE POWER SUPPLY APPARATUS

(71) Applicant: TOSHIBA MITSUBISHI-ELECTRIC INDUSTRIAL SYSTEMS CORPORATION, Chuo-ku (JP)

(72) Inventor: Yousuke Hayashi, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/043,832

(22) PCT Filed: Nov. 20, 2018

(86) PCT No.: PCT/JP2018/042863
§ 371 (c)(1),
(2) Date: Sep. 30, 2020

(87) PCT Pub. No.: WO2020/105126
PCT Pub. Date: May 28, 2020

(65) Prior Publication Data
US 2021/0036632 A1    Feb. 4, 2021

(51) Int. Cl.
| | |
|---|---|
| H02J 9/06 | (2006.01) |
| H02M 7/487 | (2007.01) |
| H02M 5/458 | (2006.01) |
| H02M 3/157 | (2006.01) |
| H02M 7/12 | (2006.01) |

(52) U.S. Cl.
CPC ............ *H02M 7/487* (2013.01); *H02J 9/062* (2013.01); *H02M 3/157* (2013.01); *H02M 5/4585* (2013.01); *H02M 7/12* (2013.01)

(58) Field of Classification Search
CPC ........ H02M 7/487; H02M 7/12; H02M 5/458; H02M 5/4585; H02J 9/062
See application file for complete search history.

(56) References Cited

U.S. PATENT DOCUMENTS

| | | | |
|---|---|---|---|
| 8,400,792 B2* | 3/2013 | Sato .................... | H02M 5/4585 363/39 |
| 8,508,957 B2* | 8/2013 | Sato ........................ | H02J 9/062 363/17 |
| 8,994,216 B2* | 3/2015 | Sato ........................ | H02J 9/062 307/66 |

FOREIGN PATENT DOCUMENTS

JP         2013-176296 A    9/2013
WO    WO 2016/163066 A1   10/2016

OTHER PUBLICATIONS

International Search Report dated Feb. 5, 2019 in PCT/JP2018/042863 filed Nov. 20, 2018, 2 pages.
(Continued)

*Primary Examiner* — Gary L Laxton
(74) *Attorney, Agent, or Firm* — Oblon, McClelland, Maier & Neustadt, L.L.P.

(57) ABSTRACT

In the present uninterruptible power supply apparatus (U1), in a power failure of a commercial AC power supply (41), a switch (1) is turned off to electrically cut off the commercial AC power supply (41) from an AC input filter (2), and when DC voltage (ΔE=Ep−En) that is the difference between terminal-to-terminal voltages (Ep, En) of first and second capacitors (C1, C2) exceeds a threshold voltage (ETH), first and second IGBT devices (Q1, Q2) or third and fourth IGBT devices (Q3, Q4) included in the converter (3) are turned on and off to reduce DC voltage (ΔE).

8 Claims, 23 Drawing Sheets

(56) References Cited

OTHER PUBLICATIONS

Office Action dated Jun. 30, 2016 in India Patent Application No. 202017044132 (with English translation); 5 pgs.

\* cited by examiner

FIG.3
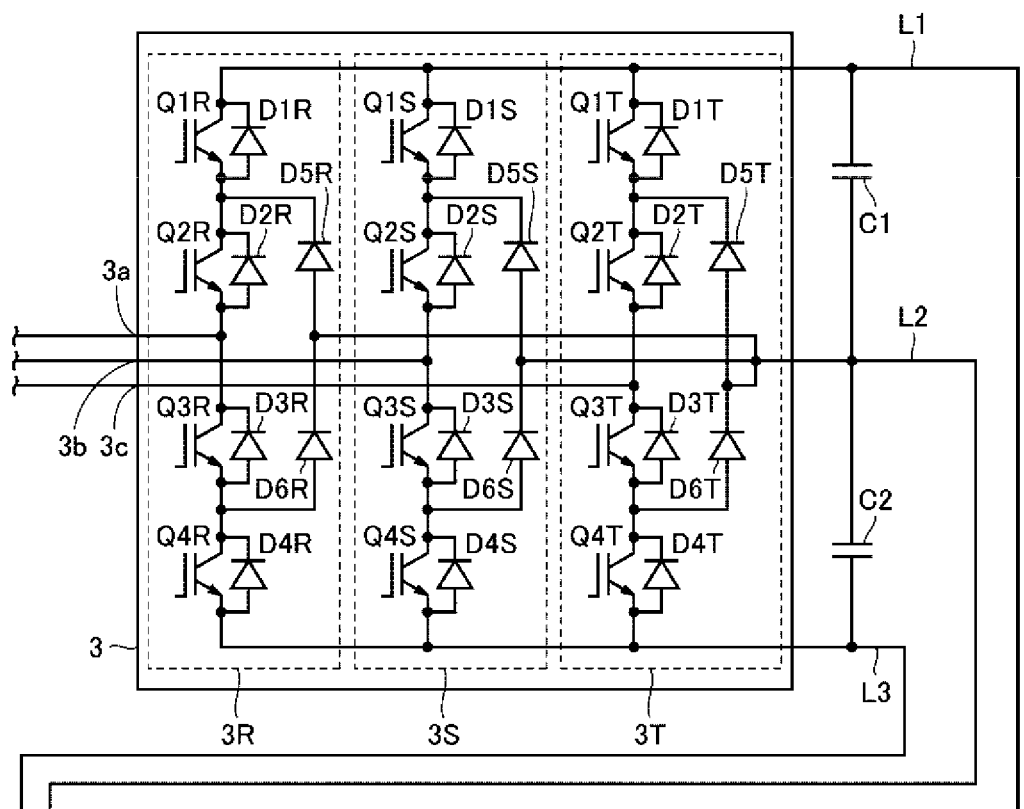
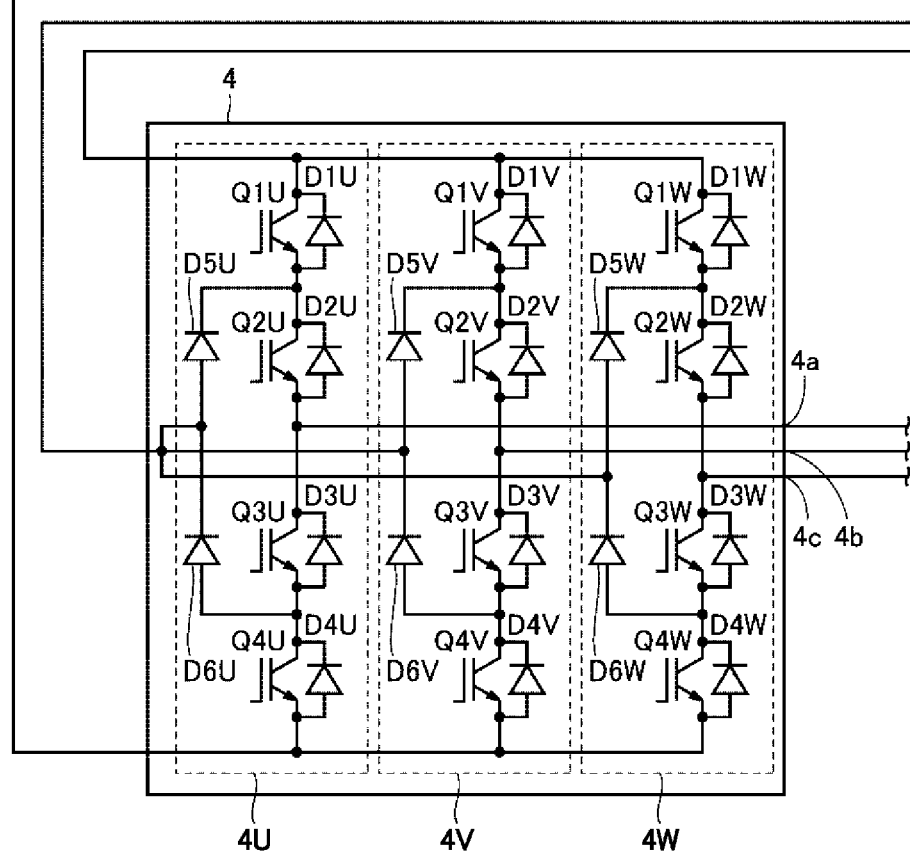

FIG.11

|        | Q1  | Q2  | Q3  | Q4  |
|--------|-----|-----|-----|-----|
| MODE 1 | ON  | ON  | OFF | OFF |
| MODE 2 | OFF | ON  | ON  | OFF |
| MODE 3 | OFF | OFF | ON  | ON  |

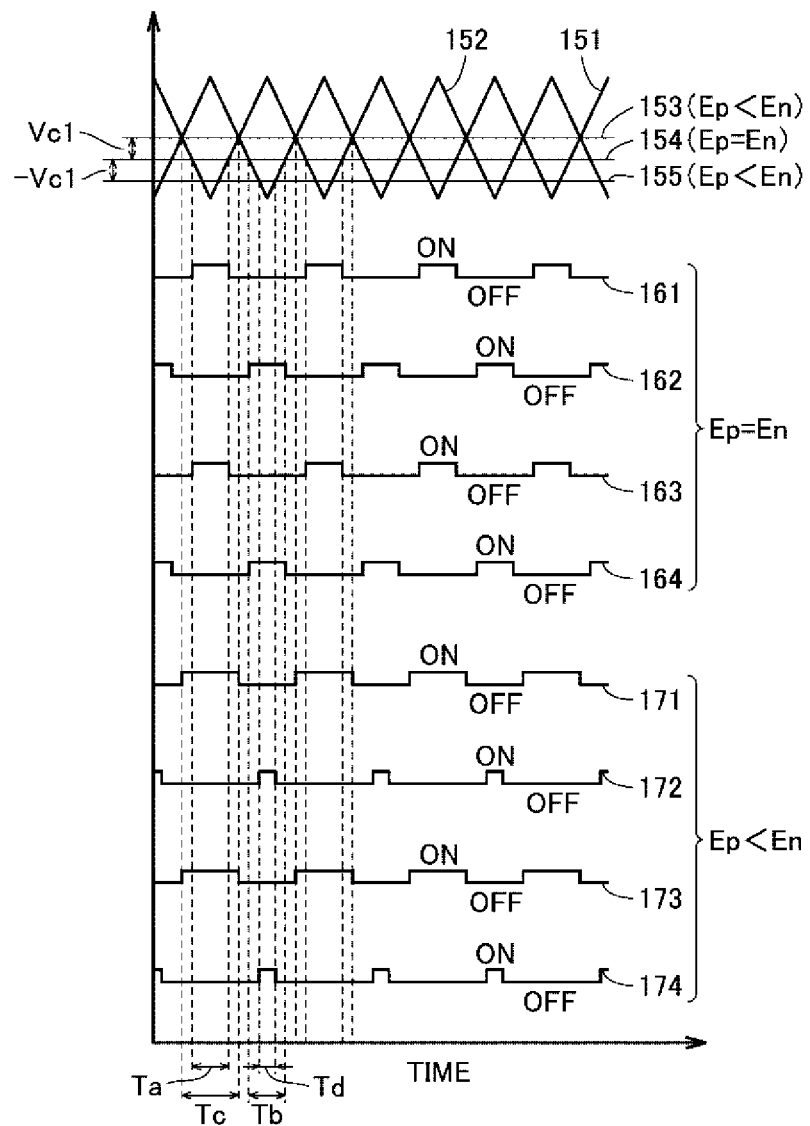

|  | Q11 | Q12 | Q13 | Q14 |
|---|---|---|---|---|
| MODE 1 | ON | ON | OFF | OFF |
| MODE 2 | OFF | ON | ON | OFF |
| MODE 3 | OFF | OFF | ON | ON |

UNINTERRUPTIBLE POWER SUPPLY APPARATUS

TECHNICAL FIELD

The present invention relates to an uninterruptible power supply apparatus and more particularly to a three-phase four-wire uninterruptible power supply apparatus.

BACKGROUND ART

For example, Japanese Patent Laying-Open No. 2013-176296 (PTL 1) discloses a three-phase three-wire uninterruptible power supply apparatus. This uninterruptible power supply apparatus includes a converter configured to convert AC voltage supplied from an AC power supply to first to third DC voltages and output the first to third DC voltages to first to third DC lines in a sound state of the AC power supply and to stop its operation in a power failure of the AC power supply, a DC voltage converter configured to convert a fourth DC voltage from a DC power supply source to first to third DC voltages and supply the first to third DC voltages to the first to third DC lines in a power failure of the AC power supply, and an inverter configured to convert the first to third DC voltages from the converter and the DC voltage converter to AC voltage and supply the AC voltage to a load.

This uninterruptible power supply apparatus further includes a first capacitor connected between the first and second DC lines, a second capacitor connected between the second and third DC lines, first and second voltage detectors configured to detect terminal-to-terminal voltages of the first and second capacitors, respectively, a computing unit configured to obtain a first voltage that is the sum of detected voltages of the first and second voltage detectors and a second voltage that is the difference between the detected values of the first and second voltage detectors, a first control unit configured to control the converter such that the first voltage becomes a reference voltage and the second voltage is removed in a sound state of the AC power supply, and a second control unit configured to control the DC voltage converter such that the first voltage becomes a reference voltage and the second voltage is removed in a power failure of the AC power supply.

In this uninterruptible power supply apparatus, therefore, the sum of terminal-to-terminal voltages of the first and second capacitors can be kept at a reference voltage, and the difference between terminal-to-terminal voltages of the first and second capacitors can be kept at 0 V.

CITATION LIST

Patent Literature

PTL 1: Japanese Patent Laying-Open No. 2013-176296

SUMMARY OF INVENTION

Technical Problem

When the load includes a three-phase transformer and a load body, three-phase excitation current flows through the three-phase transformer, and each of three phase output currents of the uninterruptible power supply apparatus has a positive-negative asymmetric waveform. When the AC power supply, the uninterruptible power supply apparatus, the three-phase transformer, and the load body are three-phase three-wire systems, the sum of three phase AC currents flowing through the three-phase transformer is zero, and therefore it is less likely that the terminal-to-terminal voltages of the first and second converters are unbalanced.

When the AC power supply, the uninterruptible power supply apparatus, the three-phase transformer, and the load body are three-phase four-wire systems, however, current flows through a neutral line. Therefore, the sum of three phase AC currents flowing through the three-phase transformer is not zero and exhibits a positive-negative asymmetric waveform, and the terminal-to-terminal voltages of the first and second capacitors may be unbalanced. In particular when load current is small, output current of the DC voltage converter is small in a power failure of the AC power supply, so that the terminal-to-terminal voltages of the first and second capacitors may be unbalanced.

A main object of the present invention is therefore to provide a three-phase four-wire uninterruptible power supply apparatus, in which a load includes a three-phase transformer and a load body, and even when load current is small, the unbalance between the terminal-to-terminal voltages of the first and second capacitors in a power failure can be eliminated.

Solution to Problem

An uninterruptible power supply apparatus according to the present invention includes: first to third DC lines; a first capacitor connected between the first and second DC lines; a second capacitor connected between the second and third DC lines; a neutral line connected to a neutral terminal of a three-phase four-wire AC power supply, the second DC line, and a neutral terminal of a three-phase four-wire load; a switch disposed corresponding to each phase of the AC power supply, having one terminal receiving AC voltage of a corresponding phase supplied from the AC power supply, turned on in a sound state of the AC power supply, and turned off in a power failure of the AC power supply; an AC input filter including a third capacitor connected between the other terminal of the switch and the neutral line, and a reactor having one terminal connected to the other terminal of the switch; a converter connected between the other terminal of the reactor and the first to third DC lines, and including a first multi-level circuit that converts AC voltage and first to third DC voltages to each other, the converter being configured to convert AC power from the AC power supply to DC power and supply the DC power to the first to third DC lines in a sound state of the AC power supply; a DC voltage converter connected between a DC power supply source and the first to third DC lines, and including a second multi-level circuit that converts a fourth DC voltage supplied from the DC power supply source and the first to third DC voltages to each other, the DC voltage converter being configured to supply DC power from the DC power supply source to the first to third DC lines in a power failure of the AC power supply; an inverter disposed between the first to third DC lines and the load, and including a third multi-level circuit that converts the first to third DC voltages and AC voltage to each other, the inverter being configured to convert DC power supplied from the converter and the DC voltage converter to AC power and supply the AC power to the load; first and second voltage detectors that detects terminal-to-terminal voltages of the first and second capacitors, respectively; a computing unit that obtains a first voltage that is a sum of the terminal-to-terminal voltages of the first and second capacitors, and a second voltage that is a difference between the terminal-to-terminal voltages of the first and second capacitors, based on detection results of the first and second voltage detectors; a first control unit that controls the converter such that the first voltage becomes a first reference voltage and the second voltage is removed, in a sound state of the AC power supply, stops the converter in a first case where an absolute value of the second voltage is smaller than a first threshold voltage, in a power failure of the AC power supply, and controls the converter to reduce the second voltage in a second case where an absolute value of the second voltage is larger than the first threshold voltage; and a second control unit that controls the DC voltage converter such that the first voltage becomes the first reference voltage and the second voltage is removed, in a power failure of the AC power supply.

The first multi-level circuit includes a first switching element connected between the first DC line and the other terminal of the reactor, a first rectifying element connected in a forward direction between the other terminal of the reactor and the first DC line, an AC switch connected between the other terminal of the reactor and the second DC line, a second switching element connected between the other terminal of the reactor and the third DC line, and a second rectifying element connected in a forward direction between the third DC line and the other terminal of the reactor. In the second case, the first control unit turns on and off the first switching element to discharge the first capacitor and charge the second capacitor when the terminal-to-terminal voltage of the first capacitor is larger than the terminal-to-terminal voltage of the second capacitor, and turns on and off the second switching element to discharge the second capacitor and charge the first capacitor when the terminal-to-terminal voltage of the second capacitor is larger than the terminal-to-terminal voltage of the first capacitor.

Advantageous Effects of Invention

In this uninterruptible power supply apparatus, in a power failure of the AC power supply, when the absolute value of the second voltage that is the difference between the terminal-to-terminal voltages of the first and second capacitors exceeds a predetermined threshold voltage, the converter is controlled so that the second voltage is reduced. More specifically, when the terminal-to-terminal voltage of the first capacitor is larger than the terminal-to-terminal voltage of the second capacitor, the first switching element is turned on and off to discharge the first capacitor and charge the second capacitor. When the terminal-to-terminal voltage of the second capacitor is larger than the terminal-to-terminal voltage of the first capacitor, the second switching element is turned on and off to discharge the second capacitor and charge the first capacitor. Therefore, even when the load includes three-phase four-wire transformer and load body, and load current is small, the unbalance between the terminal-to-terminal voltages of the first and second capacitors in a power failure can be eliminated.

BRIEF DESCRIPTION OF DRAWINGS

FIG. 3 is a circuit diagram showing a configuration of a converter and an inverter shown in FIG. 1.

FIG. 11 is a diagram showing the switching patterns of four IGBT devices included in each phase arm of the converter shown in FIG. 3.

FIG. 21 is a time chart showing the operation of control unit 54 shown in FIG. 8.

FIG. 22 is a diagram showing the switching patterns of IGBT devices Q1D to Q4D shown in FIG. 4.

DESCRIPTION OF EMBODIMENTS

First Embodiment

Figure 1:
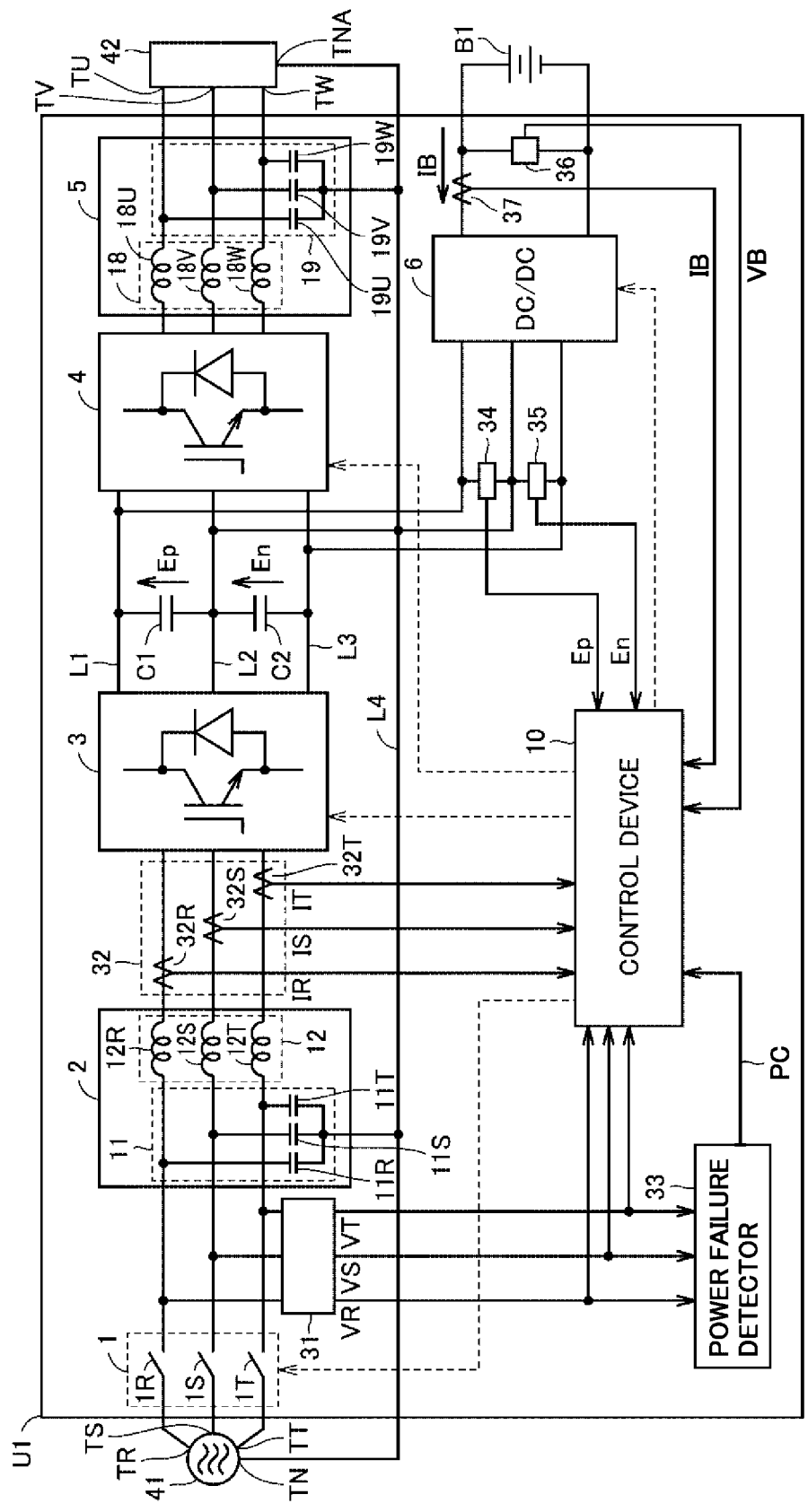
FIG. 1 is a circuit block diagram showing an overall configuration of an uninterruptible power supply apparatus according to a first embodiment of the present invention.

FIG. 1 is a block diagram showing an overall configuration of an uninterruptible power supply apparatus U1 according to a first embodiment of the present invention. In FIG. 1, uninterruptible power supply apparatus U1 is a three-phase four-wire system and includes a switch 1, an AC input filter 2, a converter 3, an inverter 4, an AC output filter 5, a DC voltage converter (denoted by "DC/DC" in the FIG. 6, a control device 10, DC lines L1 to L3, a neutral line L4, capacitors C1 and C2, voltage detectors 31, 34, 35, and 36, current detectors 32 and 37, and a power failure detector 33.

Switch 1 includes switches 1R, 1S, and 1T. One terminal of each of switches 1R, 1S, and 1T is connected to the corresponding one of R-phase terminal TR, S-phase terminal TS, and T-phase terminal TT of three-phase four-wire commercial AC power supply 41 to receive the corresponding one of R-phase voltage VR, S-phase voltage VS, and T-phase voltage VT, from commercial AC power supply 41. Neutral terminal TN of commercial AC power supply 41 is connected to one end of neutral line L4.

Switches 1R, 1S, and 1T are controlled by control device 10, turned on when three-phase AC power is supplied normally from commercial AC power supply 41 (in a sound state of commercial AC power supply 41), and turned off when supply of three-phase C power from commercial AC power supply 41 is stopped (in a power failure of commercial AC power supply 41). Switches 1R, 1S, and 1T are turned off in a power failure of commercial AC power supply 41 to electrically cut off commercial AC power supply 41 from AC input filter 2.

AC input filter 2 is a three-phase LC filter circuit configured with a capacitor 11 (capacitors 11R, 11S, 11T) and a reactor 12 (reactors 12R, 12S, 12T). One electrode of each of capacitors 11R, 11S, and 11T is connected to the other terminal of the corresponding one of switches 1R, 1S, and 1T, and the other electrodes thereof are connected together to neutral line L4. One terminal of each of reactors 12R, 12S, and 12T is connected to the other terminal of the corresponding one of switches 1R, 1S, and 1T, and the other terminals of reactors 12R, 12S, and 12T are connected to three input nodes of converter 3.

AC input filter 2 is a low pass filter, allows AC power with a commercial frequency supplied from commercial AC power supply 41 to flow through converter 3, and prevents a signal with a switching signal produced in converter 3 to pass through toward commercial AC power supply 41.

One terminal of each of DC lines L1 to L3 is connected to the corresponding one of three output nodes of converter 3, and the other terminals thereof are connected to three input nodes of inverter 4. DC line L2 is connected to neutral line L4. DC lines L1 to L3 are connected to three high voltage-side nodes of DC voltage converter 6. DC lines L1 to L3 are brought to positive voltage, neutral voltage, and negative voltage, respectively, by converter 3 and DC voltage converter 6.

Capacitor C1 is connected between DC lines L1 and L2 to smooth and stabilize DC voltage Ep between DC lines L1 and L2. Capacitor C2 is connected between DC lines L2 and L3 to smooth and stabilize DC voltage En between DC lines L2 and L3.

Converter 3 is controlled by control device 10, converts three phase AC power supplied from commercial AC power supply 41 through AC input filter 2 to DC power in a normal state of commercial AC power supply 41, and supplies the DC power to inverter 4 and DC voltage converter 6 through DC lines L1 to L3.

In doing so, control device 10 controls converter 3 such that voltage VDC=Ep+En that is the sum of DC voltages Ep and En becomes reference DC voltage VDCr (first reference voltage) and voltage $\Delta E=Ep-En$ that is the difference between DC voltages Ep and En becomes zero.

In a power failure of commercial AC power supply 41, control device 10 stops the operation of converter 3 when DC voltage $\Delta E$ is smaller than threshold voltage ETH, and controls converter 3 to reduce DC voltage $\Delta E$ when DC voltage $\Delta E$ is larger than threshold voltage ETH.

Inverter 4 is controlled by control device 10 and converts DC power from converter 3 and DC voltage converter 6 to three-phase AC power with a commercial frequency. As will be described later, each of converter 3, inverter 4, and DC voltage converter 6 includes a three-level circuit. Three-phase AC power generated by inverter 4 is supplied to load 42 through AC output filter 5.

AC output filter 5 is a three-phase LC filter circuit configured with a reactor 18 (reactor 18U, 18V, and 18W) and a capacitor 19 (capacitors 19U, 19V, and 19W). One terminal of each of reactors 18U, 18V, and 18W is connected to the corresponding one of three output nodes of inverter 4, and the other terminal thereof is connected to the corresponding one of U-phase terminal TU, V-phase terminal TV, and W-phase terminal TW of three-phase four-wire load 42.

One electrode of each of capacitors 19U, 19V, and 19W is connected to the corresponding one of the other terminals of reactors 18U, 18V, and 18W, and the other electrodes thereof are connected together to neutral line L4. AC output filter 5 is a low pass filter, allows three-phase AC power with a commercial frequency generated by inverter 4 to pass through load 42, and prevents a signal with a switching frequency produced in inverter 4 from passing through load 42. Neutral terminal TNA of load 42 is connected to neutral line L4. Load 42 is driven by three-phase AC power supplied from uninterruptible power supply apparatus U1.

Figure 2:
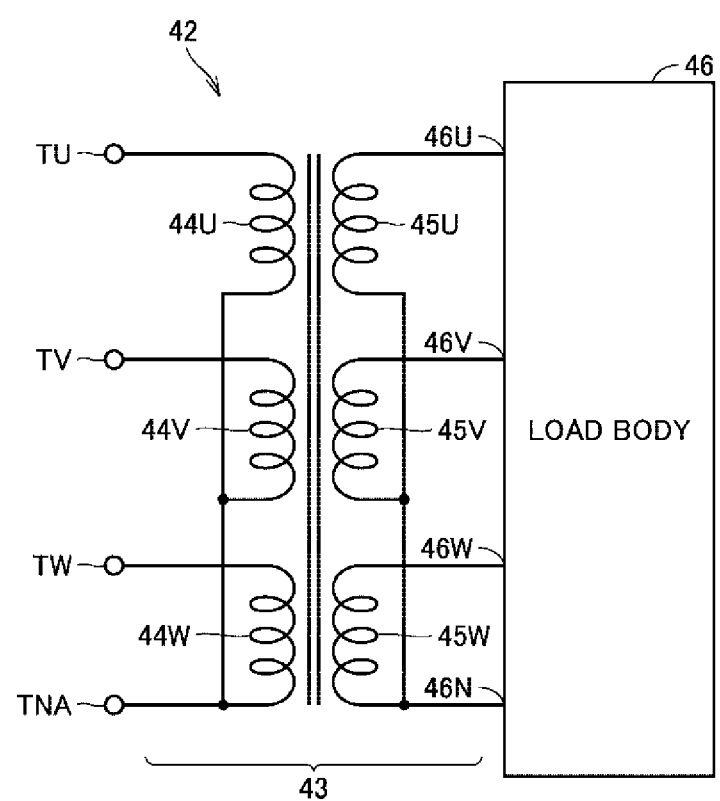
FIG. 2 is a circuit block diagram illustrating a configuration of a load shown in FIG. 1.

FIG. 2 is a circuit block diagram showing a configuration of load 42. In FIG. 2, load 42 includes a three-phase four-wire transformer 43 and a three-phase four-wire load body 46. Transformer 43 includes three primary windings 44U, 44V, and 44W and three secondary windings 45U, 45V, and 45W. One terminal of each of primary windings 44U, 44V, and 44W is connected to the corresponding one of U-phase terminal TU, V-phase terminal TV, and W-phase terminal TW of load 42, and the other terminals thereof are connected together to neutral terminal TNA of load 42.

One terminal of each of secondary windings 45U, 45V, and 45W is connected to the corresponding one of U-phase terminal 46U, V-phase terminal 46V, and W-phase terminal 46W of load body 46, and the other terminals thereof are connected together to neutral terminal 46N of load body 46. Three-phase AC voltage supplied from uninterruptible power supply apparatus U1 is, for example, lowered by transformer 43 and supplied to load body 46 to drive load body 46.

Returning to FIG. 1, a battery B1 (power storage device) is connected between two low voltage-side nodes of DC voltage converter 6. DC voltage converter 6 is controlled by control device 10 and stores DC power generated by converter 3 into battery B1 in a sound state of commercial AC power supply 41. In doing so, control device 10 controls DC voltage converter 6 such that terminal-to-terminal voltage VB of battery B1 becomes reference battery voltage VBr (second reference voltage).

DC voltage converter 6 is controlled by control device 10 and supplies DC power of battery B1 to inverter 4 through DC lines L1 to L3 in a power failure of commercial AC power supply 41. In doing so, control device 10 controls DC voltage converter 6 such that voltage VDC=Ep+En that is the sum of DC voltages Ep and En becomes reference DC voltage VDCr and voltage ΔE=Ep−En that is the difference between DC voltages Ep and En becomes 0 V.

Instead of battery B1, a capacitor (for example, electric double layer capacitor) may be connected to DC voltage converter 6. In the present first embodiment, battery B1 is installed outside of uninterruptible power supply apparatus U1. However, battery B1 may be contained in uninterruptible power supply apparatus U1.

Instead of battery B1, a DC power supply source (for example, fuel battery) may be connected. In this case, in a sound state of commercial AC power supply 41, the operation of DC voltage converter 6 is stopped.

Voltage detector 31 detects instantaneous values of AC voltages VR, VS, and VT at the other terminals of switches 1R, 1S, and 1T and outputs three phase voltage signals indicating three phase AC voltages VR, VS, and VT to control device 10 and power failure detector 33. Current detector 32 includes current detectors 32R, 32S, and 32T, detects instantaneous values of AC currents IR, IS, and IT flowing into three input nodes of converter 3, and outputs three phase current signals indicating three phase AC currents IR, IS, and IT to control device 10.

Power failure detector 33 determines whether a power failure of commercial AC power supply 41 has occurred based on three phase voltage signals from voltage detector 31 and outputs power failure signal PC indicating the determination result. In a sound state of commercial AC power supply 41, power failure signal PC goes to "L" level that is the inactive level. In a power failure of commercial AC power supply 41, power failure signal PC goes to "H" level that is the active level. Power failure signal PC is applied to control device 10.

Voltage detector 34 detects terminal-to-terminal voltage Ep of capacitor C1 and outputs a signal indicating the detected voltage Ep to control device 10. Voltage detector 35 detects terminal-to-terminal voltage En of capacitor C2 and outputs a signal indicating the detected voltage En to control device 10. Voltage detector 36 detects terminal-to-terminal voltage VB of battery B1 and outputs a signal indicating the detected voltage VB to control device 10. Current detector 37 detects current IB output from battery B1 and outputs a signal indicating the detected current IB to control device 10.

Control device 10 controls the operation of switch 1, converter 3, inverter 4, and DC voltage converter 6. As will be described in detail later, converter 3, inverter 4, and DC voltage converter 6 are configured with semiconductor switches including semiconductor switching elements. In the present first embodiment, IGBTs (Insulated Gate Bipolar Transistors) are used as semiconductor switching elements. In the present first embodiment, PWM (Pulse Width Modulation) control can be applied as a control method for semiconductor switching elements.

Control device 10 receives three phase voltage signals from voltage detector 31, three phase current signals from current detector 32, a signal indicating voltage Ep detected by voltage detector 34, a signal indicating voltage En detected by voltage detector 35, power failure signal PC from power failure detector 33, a signal indicating voltage VB detected by voltage detector 36, a signal indicating current IB detected by current detector 37, and the like, and controls the entire uninterruptible power supply apparatus U1.

FIG. 3 is a circuit diagram showing a configuration of converter 3 and inverter 4 shown in FIG. 1. In FIG. 3, converter 3 includes an R-phase arm 3R, an S-phase arm 3S, and a T-phase arm 3T. Inverter 4 includes a U-phase arm 4U, a V-phase arm 4V, and a W-phase arm 4W.

The phase arms (3R, 3S, 3T) of converter 3 and the phase arms (4U, 4V, 4W) of inverter 4 are configured as three-level circuits and each include four IGBT devices and six diodes. Specifically, R-phase arm 3R includes IGBT devices Q1R to Q4R and diodes D1R to D6R. S-phase arm 3S includes IGBT devices Q1S to Q4S and diodes D1S to D6S. T-phase arm 3T includes IGBT devices Q1T to Q4T and diodes D1T to D6T. U-phase arm 4U includes IGBT devices Q1U to Q4U and diodes D1U to D6U. V-phase arm 4V includes IGBT devices Q1V to Q4V and diodes D1V to D6V. W-phase arm 4W includes IGBT devices Q1W to Q4W and diodes D1W to D6W.

Hereinafter, reference signs R, S, T, U, V, and W are collectively denoted by a reference sign "x" when the phase arms of converter 3 and the phase arms of inverter 4 are collectively described. IGBT devices $Q1x$ to $Q4x$ are connected in series between DC lines L1 and L3. Diodes $D1x$ to $D4x$ are connected in anti-parallel with IGBT devices $Q1x$ to $Q4x$, respectively. Diode $D5x$ is connected to the connection point between IGBT devices $Q1x$ and $Q2x$ and to DC line L2. Diode $D6x$ is connected to the connection point between IGBT devices $Q3x$ and $Q4x$ and to DC line L2.

The cathode of diode $D5x$ is connected to the connection point between IGBT devices $Q1x$ and $Q2x$, and the anode of diode $D5x$ is connected to DC line L2. The anode of diode $D6x$ is connected to the connection point between IGBT devices $Q3x$ and $Q4x$, and the cathode of diode $D6x$ is connected to DC line L2. Diodes $D1x$ to $D4x$ function as free-wheel diodes, and diodes $D5x$ and $D6x$ function as clamp diodes.

Converter 3 includes three input nodes 3a to 3c. Input node 3a is connected to the other terminal of reactor 12R (FIG. 1) and connected to the connection point between IGBT devices Q2R and Q3R. Input node 3b is connected to the other terminal of reactor 12S (FIG. 1) and connected to the connection point between IGBT devices Q2S and Q3S. Input node 3c is connected to the other terminal of reactor 12T (FIG. 1) and connected to the connection point between IGBT devices Q2T and Q3T.

Inverter 4 includes three output nodes 4a to 4c. Output node 4a is connected to the connection point between IGBT devices Q2U and Q3U and connected to one terminal of reactor 18U (FIG. 1). Output node 4b is connected to the connection point between IGBT devices Q2V and Q3V and connected to one terminal of reactor 18V (FIG. 1). Output node 4c is connected to the connection point between IGBT devices Q2W and Q3W and connected to one terminal of reactor 18W (FIG. 1).

Figure 4:
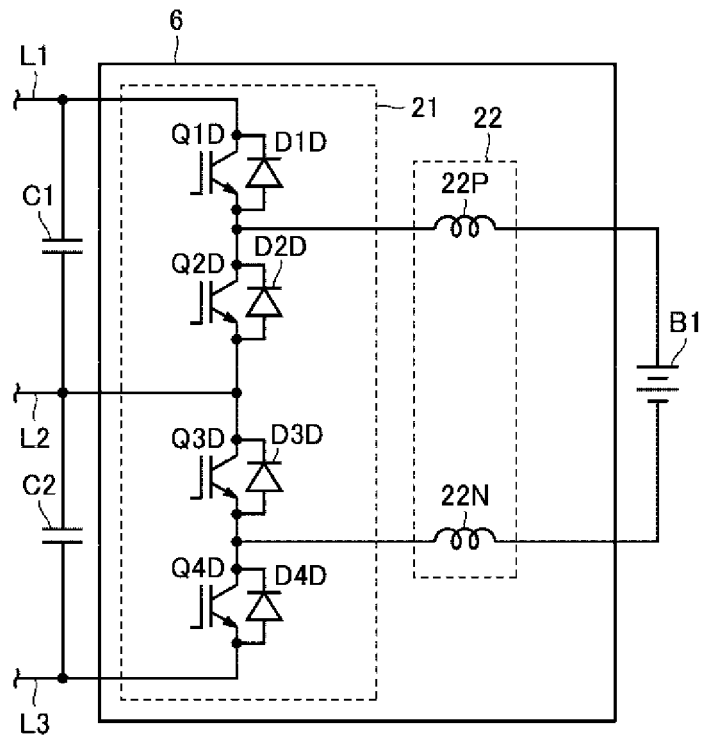
FIG. 4 is a circuit diagram showing a configuration of a DC voltage converter shown in FIG. 1.

FIG. 4 is a circuit diagram showing a configuration of DC voltage converter 6 shown in FIG. 1. In FIG. 4, DC voltage converter 6 includes a semiconductor switch 21 and a reactor 22. Semiconductor switch 21 is configured as a three-level circuit and includes IGBT devices Q1D to Q4D connected in series between DC lines L1 and L3 and diodes D1D to D4D connected in anti-parallel with IGBT devices Q1D to Q4D, respectively. Reactor 22 includes reactors 22P and 22N. Reactor 22P is connected between the connection point of IGBT devices Q1D and Q2D and the positive electrode of battery B1. Reactor 22N is connected between the connection point of IGBT devices Q3D and Q4D and the negative electrode of battery B1.

Figure 5:
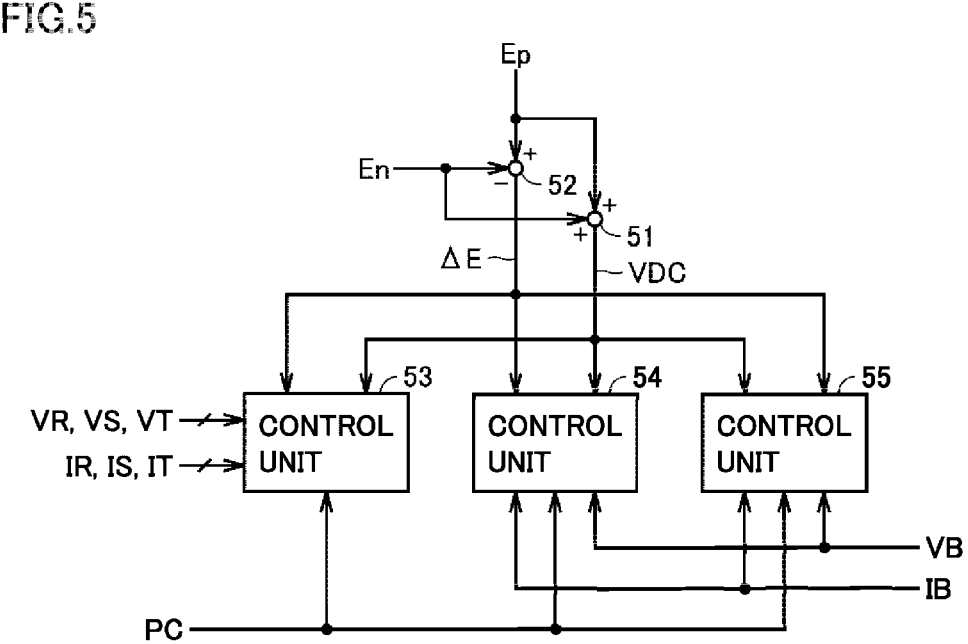
FIG. 5 is a block diagram showing a portion related to control of the converter and the DC voltage converter in a control device shown in FIG. 1.

FIG. 5 is a block diagram showing a portion related to control of converter 3 and DC voltage converter 6 in control device 10 (FIG. 1). In FIG. 5, control device 10 includes an adder 51, a subtractor 52, and control units 53 to 55. Adder 51 adds terminal-to-terminal voltages Ep and En of capacitors C1 and C2 detected by voltage detectors 34 and 35 to obtain DC voltage VDC=Ep+En between DC lines L1 and L3. Subtractor 52 subtracts terminal-to-terminal voltage En of capacitor C2 detected by voltage detector 35 from terminal-to-terminal voltage Ep of capacitor C1 detected by voltage detector 34 to obtain DC voltage ΔE=Ep−En that is the difference between terminal-to-terminal voltages Ep and En of capacitors C1 and C2. DC voltages VDC and ΔE are applied to each of control units 53 to 55.

Control unit 53 controls converter 3, based on power failure signal PC from power failure detector 33, signals indicating three phase AC voltages VR, VS, and VT from voltage detector 31, signals indicating three phase AC currents IR, IS, and IT from current detector 32, a signal indicating DC voltage VDC (first voltage) from adder 51, and a signal indicating DC voltage ΔE (second voltage) from subtractor 52.

Specifically, when power failure signal PC is "L" level that is the inactive level (in a sound state of commercial AC power supply 41), control unit 53 controls converter 3 such that three phase AC voltages VR, VS, and VT are in phase with three phase AC currents IR, IS, and IT, DC voltage VDC becomes reference DC voltage VDCr, and DC voltage ΔE becomes zero.

When power failure signal PC is "H" level that is the active level (in a power failure of commercial AC power supply 41), control unit 53 stops the operation of converter 3 if the absolute value of DC voltage ΔE is smaller than threshold voltage ETH.

When power failure signal PC is "H" level that is the active level (in a power failure of commercial AC power supply 41), control unit 53 controls converter 3 to reduce DC voltage ΔE when the absolute value of DC voltage ΔE is larger than threshold voltage ETH.

Control units 54 and 55 controls DC voltage converter 6, based on power failure signal PC from power failure detector 33, a signal indicating battery voltage VB from voltage detector 36, a signal indicating DC current IB from current detector 37, a signal indicating DC voltage VDC from adder 51, and a signal indicating DC voltage ΔE from subtractor 52.

Specifically, control unit 54 is activated when power failure signal PC is "H" level that is the active level (in a power failure of commercial AC power supply 41) and controls DC voltage converter 6 such that current IB at the level corresponding to battery voltage VB flows from battery B1 to capacitors C1 and C2, DC voltage VDC becomes reference DC voltage VDCr, and DC voltage ΔE becomes zero.

Control unit 55 is activated when power failure signal PC is "L" level that is the inactive level (in a sound state of commercial AC power supply 41) and controls DC voltage converter 6 such that current IB at the level corresponding to DC voltage VDC flows from capacitors C1 and C2 to battery B1 and battery voltage VB becomes reference battery voltage VBr.

Figure 6:
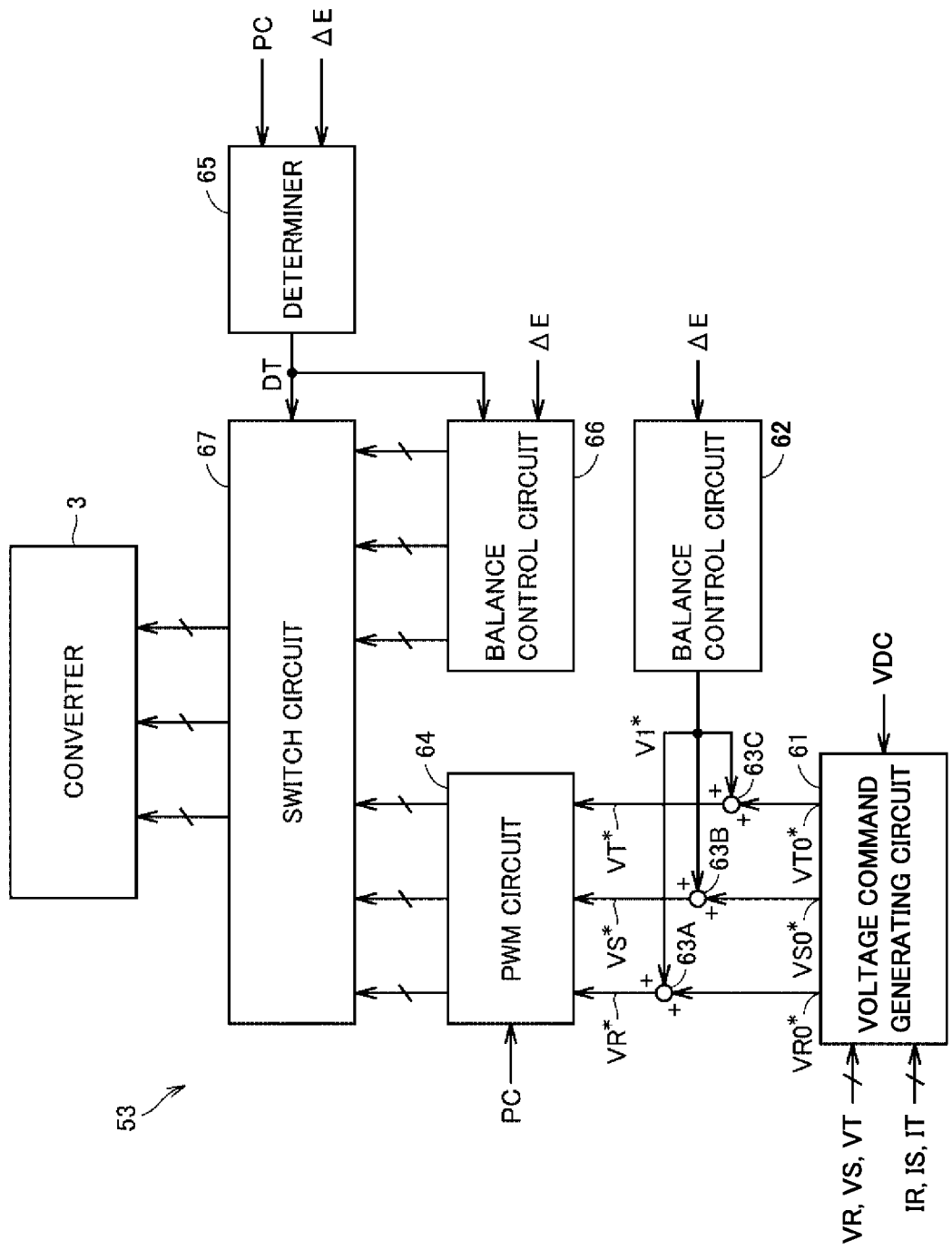
FIG. 6 is a block diagram showing a configuration of a control unit 53 shown in FIG. 5.
Figure 7:
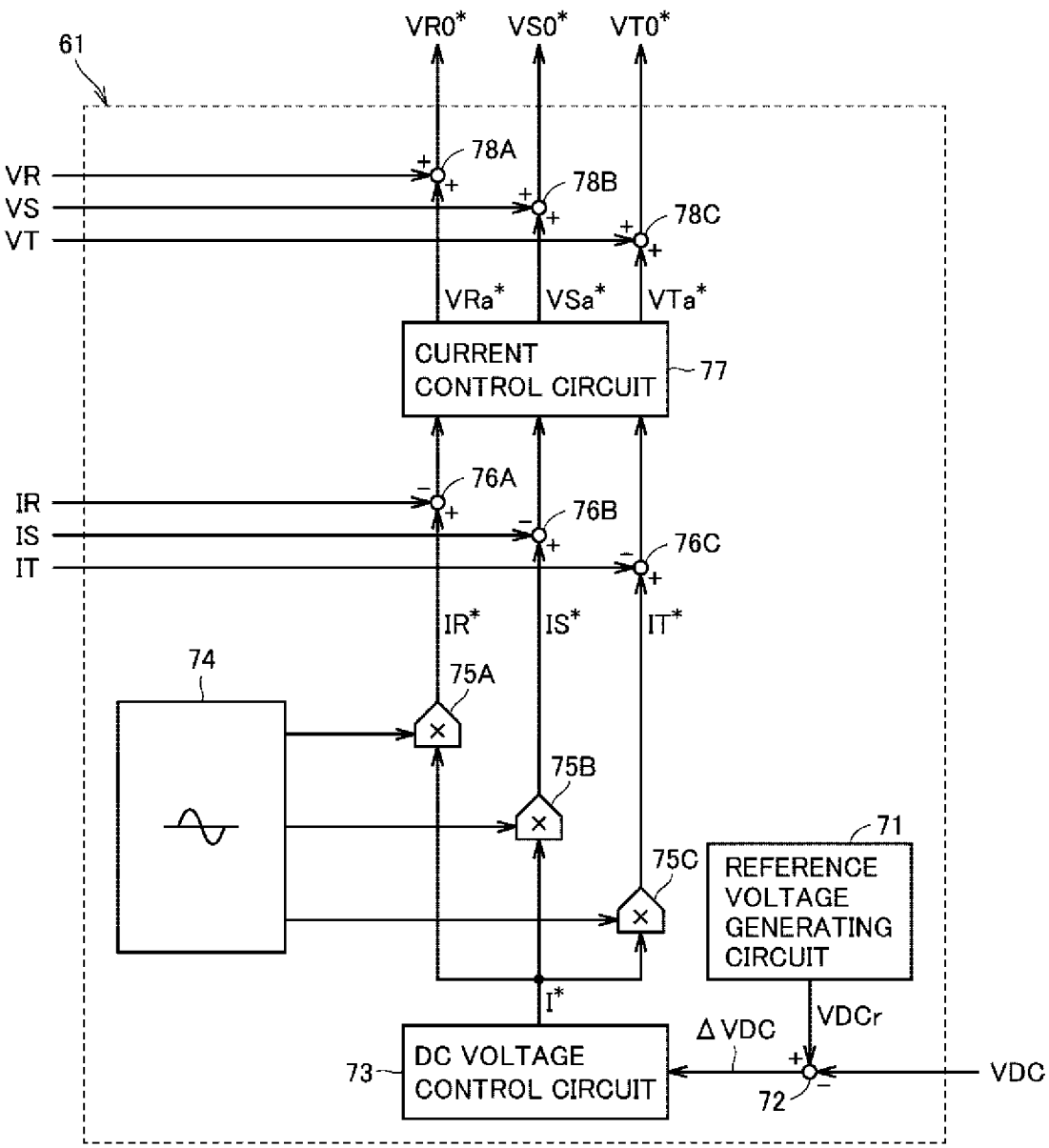
FIG. 7 is a block diagram showing a configuration of a voltage command generating circuit shown in FIG. 6.

FIG. 6 is a block diagram showing a configuration of control unit 53 shown in FIG. 5. In FIG. 6, control unit 53 includes a voltage command generating circuit 61, balance control circuits 62 and 66, adders 63A to 63C, a PWM circuit 64, a determiner 65, and a switch circuit 67. As shown in FIG. 7, voltage command generating circuit 61 includes a reference voltage generating circuit 71, subtractors 72 and 76A to 76C, a DC voltage control circuit 73, a sine wave generating circuit 74, multipliers 75A to 75C, a current control circuit 77, and adders 78A to 78C.

Reference voltage generating circuit 71 generates reference DC voltage VDCr. Subtractor 72 calculates voltage ΔVDC=VDCr−VDC that is the difference between reference DC voltage VDCr and DC voltage VDC from adder 51 (FIG. 5). DC voltage control circuit 73 calculates current command value I* for controlling current flowing to the input side of converter 3 such that voltage ΔVDC becomes zero. DC voltage control circuit 73 calculates current command value I*, for example, by performing proportional operation or proportional integral operation of ΔVDC.

Sine wave generating circuit 74 outputs a sine wave signal in phase with R-phase voltage VR of commercial AC power supply 41, a sine wave signal in phase with S-phase voltage VS of commercial AC power supply 41, and a sine wave signal in phase with T-phase voltage VT of commercial AC power supply 41. Sine wave generating circuit 74 outputs three phase sine wave signals even in a power failure of commercial AC power supply 41. Three sine wave signals are input to multipliers 75A to 75C and multiplied by current command value I*. Current command values IR*, IS*, and IT* in phase with three phase AC voltages VR, VS, and VT of commercial AC power supply 41 are thus generated.

Subtractor 76A calculates the difference between current command value IR* and R-phase current IR detected by current detector 32R. Subtractor 76B calculates the difference between current command value IS* and S-phase current IS detected by current detector 32S. Subtractor 76C calculates the difference between current command value IT* and T-phase current IT detected by current detector 32T.

Current control circuit 77 generates voltage command values VRa*, VSa*, and VTa*, as voltages to be applied to reactor 12 such that all of the difference between current command value IR* and R-phase current IR, the difference between current command value IS* and S-phase current IS, and the difference between current command value IT* and T-phase current IT are zero. Current control circuit 77 generates a voltage command value, for example, by amplifying the difference between the current command value and the current value detected by the current detector in accordance with proportional control or proportional integral control.

Adder 78A adds voltage command value VRa* to R-phase voltage VR detected by voltage detector 31 to generate voltage command value VR0*. Adder 78B adds voltage command value VSa* to S-phase voltage VS detected by voltage detector 31 to generate voltage command value VS0*. Adder 78C adds voltage command value VTa* to T-phase voltage VT detected by voltage detector 31 to generate voltage command value VT0*.

In this way, voltage command generating circuit 61 receives three phase AC voltages VR, VS, and VT detected by voltage detector 31, three phase AC currents IR, IS, and IT detected by current detector 32, and DC voltage VDC calculated by adder 51 and generates voltage command values VR0*, VS0*, and VT0* corresponding to R phase, S phase, and T phase, respectively.

Returning to FIG. 6, balance control circuit 62 generates voltage command value V1* based on DC voltage ΔE=Ep−En from subtractor 52 (FIG. 5). For example, balance control circuit 62 generates voltage command value V1* by performing proportional operation or proportional integral operation of ΔE. When ΔE=Ep−En>0, voltage command value V1* is generated such that the charging time of capacitor C1 is shorter than the charging time of capacitor C2. When ΔE=Ep−En<0, voltage command value V1* is generated such that the charging time of capacitor C1 is longer than the charging time of capacitor C2.

Adder 63A adds voltage command values VR0* and V1* to generate voltage command value VR*. Adder 63B adds voltage command values VS0* and V1* to generate voltage command value VS*. Adder 63C adds voltage command values VT0* and V1* to generate voltage command value VT*.

When power failure signal PC from power failure detector 33 (FIG. 1) is "L" level that is the inactive level (in a sound state of commercial AC power supply 41), PWM circuit 64 outputs a signal for allowing three phase AC voltages VR, VS, and VT detected by voltage detector 31 to be equal to voltage command values VR*, VS*, and VT*, respectively, based on voltage command values VR*, VS*, and VT*. This signal is a signal for driving four IGBT devices included in each phase arm of converter 3.

When power failure signal PC is "H" level that is the active level (in a power failure of commercial AC power supply 41), PWM circuit 64 outputs a signal for turning off four IGBT devices included in each phase arm of converter 3.

Determiner 65 generates signal DT, based on power failure signal PC from power failure detector 33 (FIG. 1) and DC voltage ΔE from subtractor 52 (FIG. 5). When power failure signal PC is "L" level that is the inactive level (in a sound state of commercial AC power supply 41), signal DT is brought to "L" level that is the inactive level.

When power failure signal PC is "H" level that is the active level (in a power failure of commercial AC power supply 41), signal DT is brought to "L" level that is the inactive level if the absolute value of DC voltage ΔE is smaller than threshold voltage ETH. When power failure signal PC is "H" level that is the active level (in a power failure of commercial AC power supply 41), signal DT is brought to "H" level that is the active level if the absolute value of DC voltage ΔE is larger than threshold voltage ETH.

Balance control circuit 66 is activated when signal DT is "H" level that is the active level and outputs a signal for controlling converter 3 to reduce DC voltage ΔE, based on DC voltage ΔE. This signal is a signal for driving four IGBT devices included in each phase arm of converter 3.

When DC voltage ΔE is a positive voltage (that is, when Ep>En), balance control circuit 66 reduces ΔE by controlling converter 3 such that capacitor C1 is discharged and capacitor C2 is charged.

When DC voltage ΔE is a negative voltage (that is, when Ep<En), balance control circuit 66 reduces ΔE by controlling converter 3 such that capacitor C2 is discharged and capacitor C1 is charged.

Switch circuit 67 connects PWM circuit 64 to converter 3 when output signal DT of determiner 65 is "L" level that is the inactive level, and connects balance control circuit 66 to converter 3 when signal DT is "H" level that is the active level.

Converter 3 is controlled by control unit 53 having the configuration above, whereby three phase AC currents IR, IS, and IT are in phase with three phase AC voltages VR, VS, and VT of commercial AC power supply 41 and are sinusoidal currents, thereby bringing the power factor to almost one.

Figure 8:
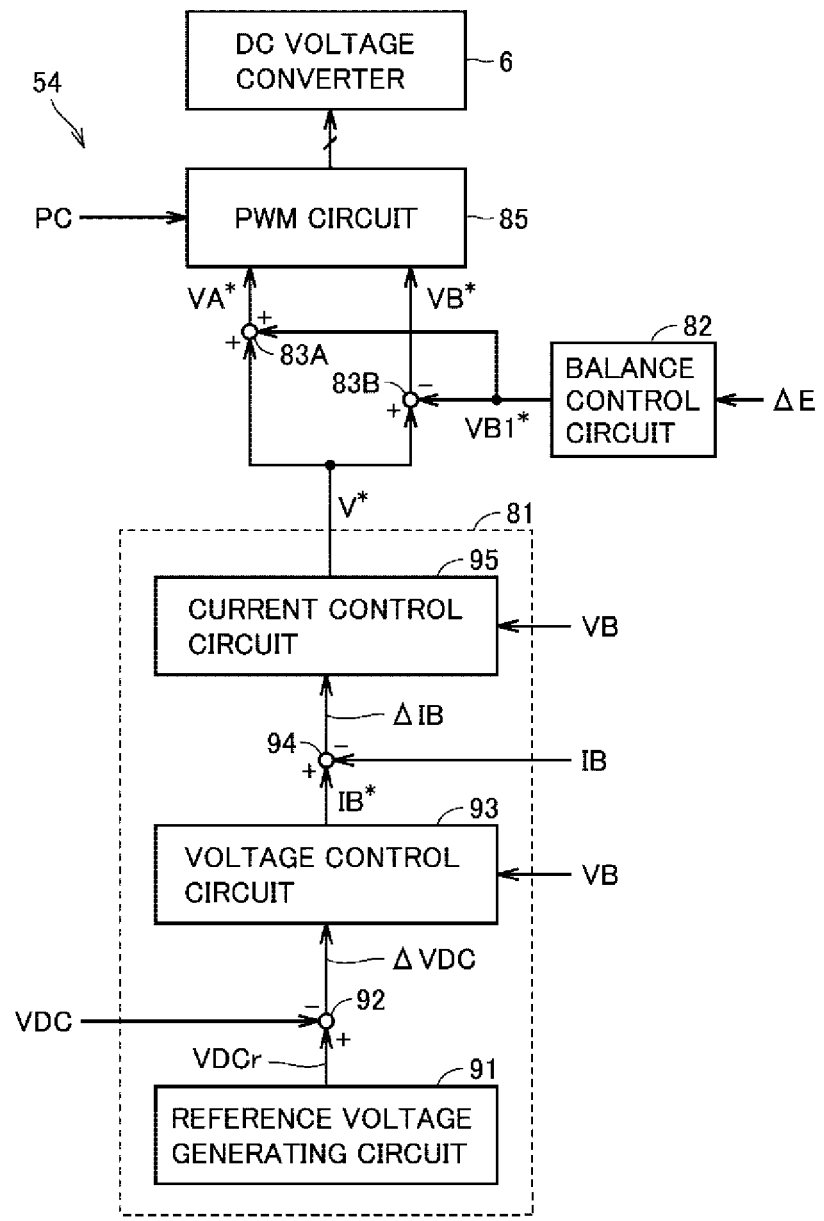
FIG. 8 is a block diagram showing a configuration of a control unit 54 shown in FIG. 5.

FIG. 8 is a block diagram showing a configuration of control unit 54 shown in FIG. 5. In FIG. 8, control unit 54 includes a voltage command generating circuit 81, a balance control circuit 82, adders 83A and 83B, and a PWM circuit 75. Voltage command generating circuit 81 includes a reference voltage generating circuit 91, a subtractor 92, a voltage control circuit 93, an adder 94, and a current control circuit 95.

Reference voltage generating circuit 91 generates reference DC voltage VDCr. Subtractor 92 calculates voltage ΔVDC that is the difference between reference DC voltage VDCr and DC voltage VDC detected by adder 51 (FIG. 5). Voltage control circuit 93 calculates current command value IB* at the level corresponding to voltage ΔVDC, based on terminal-to-terminal voltage VB of battery B1 detected by voltage detector 36 (FIG. 1). Voltage control circuit 93 calculates current command value IB*, for example, by performing proportional operation or proportional integral operation of ΔVDC. Adder 94 obtains deviation ΔIB=IB*−IB between current command value IB* generated by voltage control circuit 93 and current value IB of battery B1 detected by current detector 37 (FIG. 1). Current control circuit 95 generates voltage command value V* based on deviation ΔIB between current command value IB* and current value IB.

In this way, voltage command generating circuit 81 receives battery voltage VB detected by voltage detector 36, battery current IB detected by current detector 37, and DC voltage VDC calculated by adder 51 and generates voltage command value V* for controlling terminal-to-terminal voltages Ep and En of capacitors C1 and C2 to a predetermined voltage.

Balance control circuit 82 receives DC voltage ΔE=Ep−En from subtractor 52 (FIG. 5) and generates voltage command value VB1*. For example, balance control circuit 82 generates voltage command value VB1* by performing proportional operation or proportional integral operation of DC voltage ΔE. For example, when ΔE>0, balance control circuit 82 sets voltage command value VB1* to a negative value. On the other hand, when ΔE<0, balance control circuit 82 sets voltage command value VB1* to a positive value.

Adder 83A adds voltage command values V* and VB1* to generate voltage command value VA*. Subtractor 83B subtracts voltage command value VB1* from voltage command value VB1* to generate voltage command value VB*. Voltage command values VA* and VB* are command values for controlling the voltages in the upper arm and the lower arm of semiconductor switch 21, respectively, and are command values of voltages Ep and En for bringing the difference ΔE between voltages Ep and En to zero. Balance control circuit 82, adder 83A, and subtractor 83B constitute a command value generating circuit that generates voltage command values VA* and VB* for controlling voltages Ep and En, respectively, such that DC voltage ΔE=Ep−En becomes zero, based on DC voltage ΔE and voltage command value V. PWM circuit 85 is activated when power failure signal PC is "H" level that is the active level (in a power failure of commercial AC power supply 41) and outputs a signal for driving four IGBT devices included in semiconductor switch 21, based on voltage command values VA* and VB*. DC voltage converter 6 is controlled by a signal from PWM circuit 85 and supplies DC power of battery B1 to inverter 4.

When power failure signal PC is "L" level that is the inactive level (in a sound state of commercial AC power supply 41), PWM circuit 85 is deactivated and does not perform PWM control of DC voltage converter 6. In a sound state of commercial AC power supply 41, DC voltage converter 6 is controlled by control unit 55 (FIG. 5) and stores DC power into battery B1.

Figure 9:
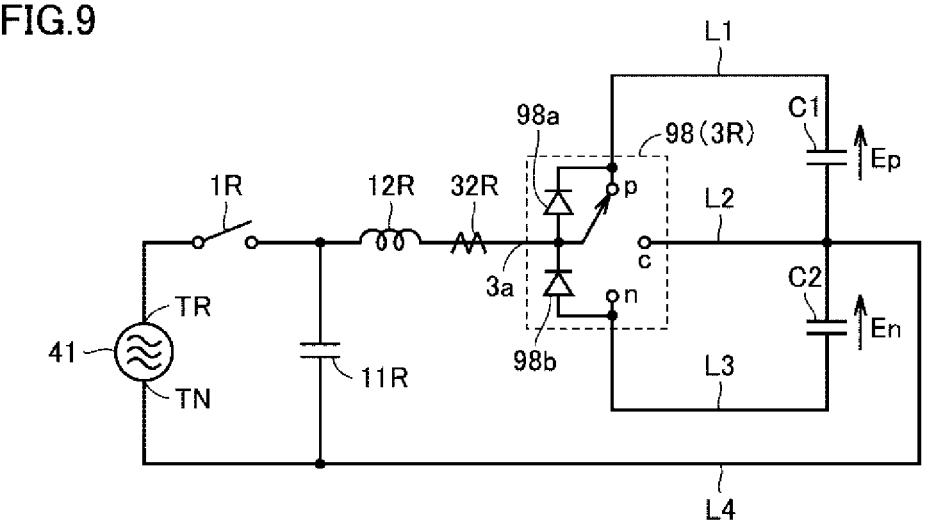
FIG. 9 is an equivalent circuit diagram showing a configuration of one phase of the converter shown in FIG. 3.

FIG. 9 is an equivalent circuit diagram showing a configuration of one phase of converter 3 shown in FIG. 3. In FIG. 9, as one phase arm, R-phase arm 3R is denoted as a switch 98. Switch 98 includes a diode 98a (first rectifying element), a diode 98b (second rectifying element), a common terminal connected to input node 3a of converter 3, and three switch terminals respectively connected to DC lines L1, L2, and L3.

Diode 98a corresponds to diodes D1R and D2R (FIG. 3), and diode 98b corresponds to diodes D3R and D4R (FIG. 3). Diode 98a has the anode connected to input node 3a of converter 3 and the cathode connected to DC line L1. That is, diode 98a is connected in the forward direction between input node 3a and DC line L1. Diode 98b has the anode connected to DC line L3 and the cathode connected to input node 3a of converter 3. That is, diode 98b is connected in the forward direction between DC line L3 and input node 3a. In this switch 98, the common terminal is connected to any one of three switch terminals.

In this equivalent circuit, for example, AC output in the inverter operation has one of three potential states (p, c, n). Here, p, c, and n are voltages of DC line L1, L2, and 13, respectively. The voltages of DC lines L1, L2, and L3 are positive voltage, neutral voltage, and negative voltage, respectively. Neutral voltage is, for example, ground voltage (0 V).

Figure 10:
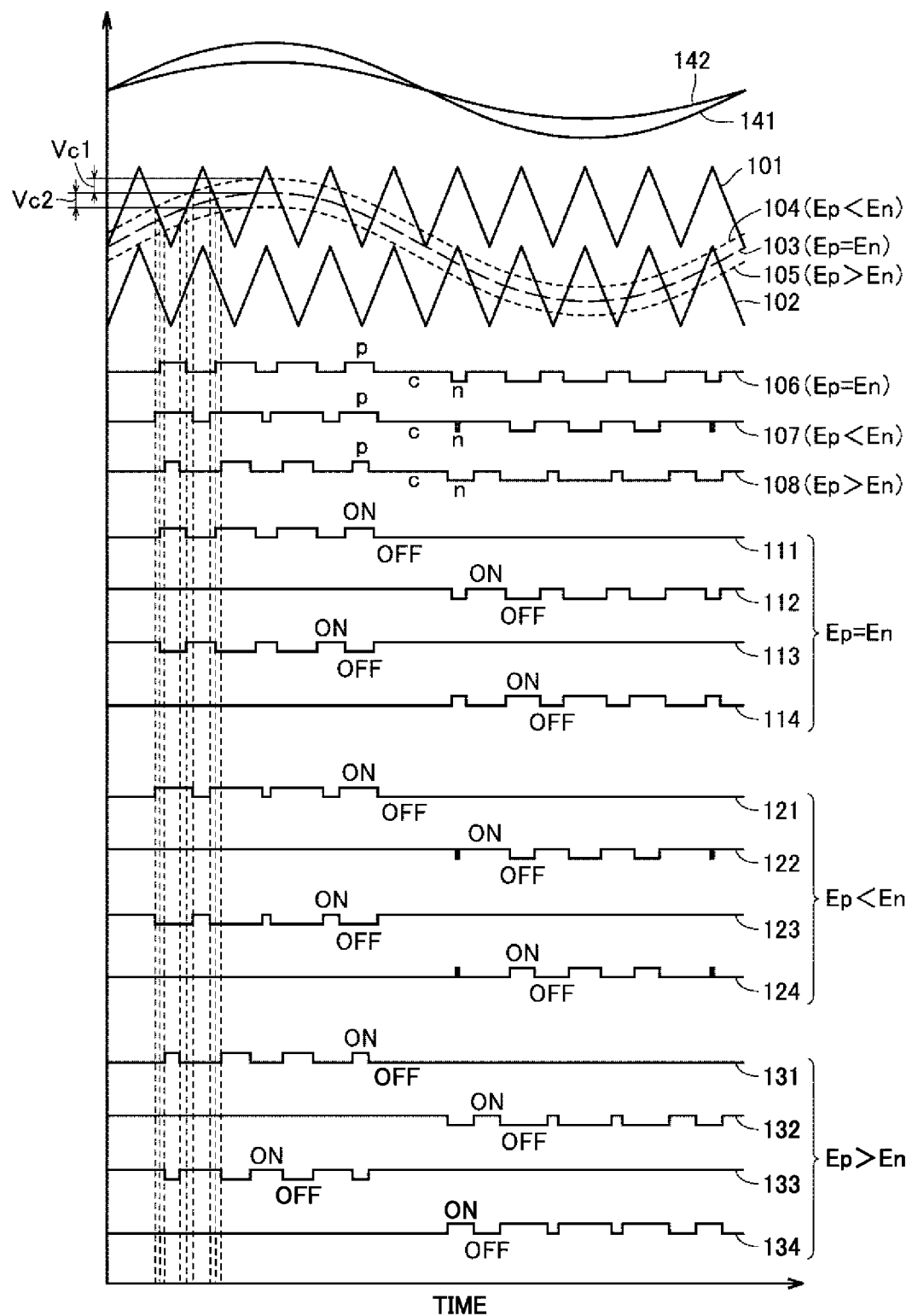
FIG. 10 is a time chart showing the operation of control unit 53 shown in FIG. 6.

FIG. 10 is a time chart showing the operation of control unit 53 shown in FIG. 6. FIG. 10 shows PWM control of one phase (for example, R phase) of converter 3 (three-level PWM converter) in a sound state of commercial AC power supply 41. In the following description, four IGBT devices included in each phase arm are denoted by reference signs Q1 to Q4.

In FIG. 10, since converter 3 is operated at a power factor of 1.0, the polarities of input phase voltage 141 and phase current 142 are matched. Voltage command signal 103 is a voltage command signal (VR0*) in a state not corrected by balance control circuit 62 (FIG. 6). Voltage command signal 103 is set to a sine wave signal in phase with R-phase voltage VR of commercial AC power supply 41 by sine wave generating circuit 74 (FIG. 7). In PWM circuit 64, the levels of voltage command signal 103 and reference signals 101, 102 are compared, whereby the switching patterns of four IGBT devices included in R phase (this is applicable to S phase and T phase) are determined. The switching patterns of IGBT devices Q1 to Q4 in the phase arm in this case are switching patterns 111 to 114, and the output voltage of converter 3 is phase voltage 106.

Each of reference signals 101 and 102 is a triangular wave signal having a switching frequency sufficiently higher than a commercial frequency. The phase and the amplitude of reference signal 101 match the phase and the amplitude of reference signal 102. Reference signal 101 changes between 0 V and a positive peak voltage. Reference signal 102 changes between a negative peak voltage and 0 V. The amplitude of voltage command signal 103 is smaller than the sum of amplitudes of reference signals 101 and 102.

When the level of voltage command signal 103 is higher than the level of reference signal 101, IGBT devices Q1 and Q2 are turned on, and IGBT devices Q3 and Q4 are turned off. When the level of voltage command signal 103 is between the levels of reference signals 101 and 102, IGBT devices Q2 and Q3 are turned on, and IGBT devices Q1 and Q4 are turned off. When the level of voltage command signal 103 is lower than the level of reference signal 102, IGBT devices Q3 and Q4 are turned on, and IGBT devices Q1 and Q2 are turned off.

Voltage command signal 104 is a voltage command signal (VR*) corrected by balance control circuit 62 when Ep<En and is obtained by adding adjustment signal Vc1 to voltage command signal 103. In PWM circuit 64, the levels of voltage command signal 104 and reference signals 101, 102 are compared, whereby the switching patterns of four IGBT devices included in R phase (this is applicable to S phase and T phase) are determined. The switching patterns of IGBT devices Q1 to Q4 in the phase arm in this case are switching patterns 121 to 124, and the output voltage of converter 3 is phase voltage 107.

When the level of voltage command signal 104 is higher than the level of reference signal 101, IGBT devices Q1 and Q2 are turned on, and IGBT devices Q3 and Q4 are turned off. When the level of voltage command signal 104 is between the levels of reference signals 101 and 102, IGBT devices Q2 and Q3 are turned on, and IGBT devices Q1 and Q4 are turned off. When the level of voltage command signal 104 is lower than the level of reference signal 102, IGBT devices Q3 and Q4 are turned on, and IGBT devices Q1 and Q2 are turned off.

As can be understood from FIG. 10, when Ep<En (switching patterns 121 to 124), the ON time of IGBT devices Q1 and Q2 (the charging time of capacitor C1) is longer, and the ON time of IGBT devices Q3 and Q4 (the charging time of capacitor C2) is shorter, compared with when Ep=En (switching patterns 111 to 114). Therefore, ΔE=Ep−En is reduced.

Voltage command signal 105 is a voltage command signal (VR*) corrected by balance control circuit 62 when Ep>En and is obtained by adding adjustment signal Vc2 to voltage command signal 103. In PWM circuit 64, the levels of voltage command signal 105 and reference signals 101, 102 are compared, whereby the switching patterns of four IGBT devices included in R phase (this is applicable to S phase and T phase) are determined. The switching patterns of IGBT devices Q1 to Q4 in the phase arm in this case are switching patterns 131 to 134, and the output voltage of converter 3 is phase voltage 108.

When the level of voltage command signal 105 is higher than the level of reference signal 101, IGBT devices Q1 and Q2 are turned on, and IGBT devices Q3 and Q4 are turned off. When the level of voltage command signal 105 is between the levels of reference signals 101 and 102, IGBT devices Q2 and Q3 are turned on, and IGBT devices Q1 and Q4 are turned off. When the level of voltage command signal 105 is lower than the level of reference signal 102, IGBT devices Q3 and Q4 are turned on, and IGBT devices Q1 and Q2 are turned off.

As can be understood from FIG. 10, when Ep>En (switching patterns 131 to 134), the ON time of IGBT devices Q1 and Q2 (the charging time of capacitor C1) is shorter, and the ON time of IGBT devices Q3 and Q4 (the charging time of capacitor C2) is longer, compared with when Ep=En (switching patterns 111 to 114). Therefore, ΔE=Ep−En is reduced.

Voltage command signal 103 corresponds to a voltage command value (VR0*, VS0*, VT0*) from voltage command generating circuit 61 (FIG. 6), and each of adjustment signals Vc1 and Vc2 corresponds to voltage command value V1* from balance control circuit 62. Voltage command value V1* is positive when Ep<En and is negative when Ep>En.

Figure 12:
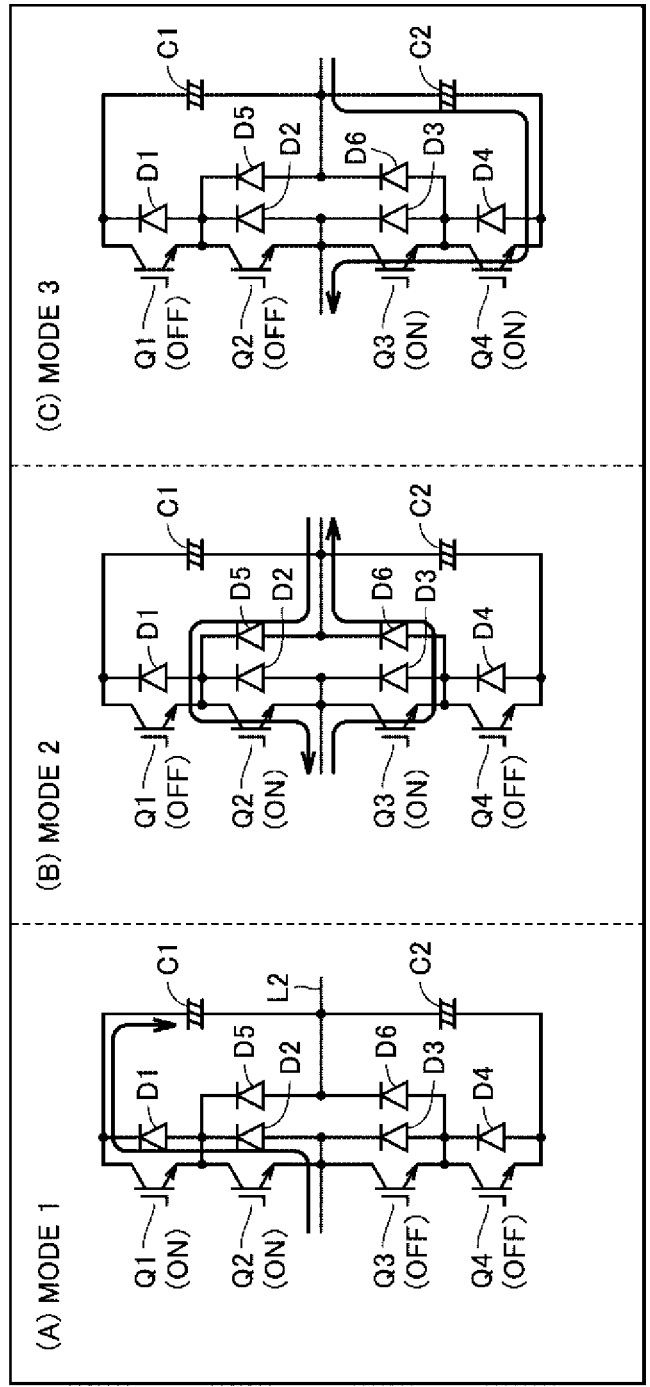
FIG. 12 is a circuit diagram showing the operation of each phase arm in the modes shown in FIG. 11.
Figure 13:
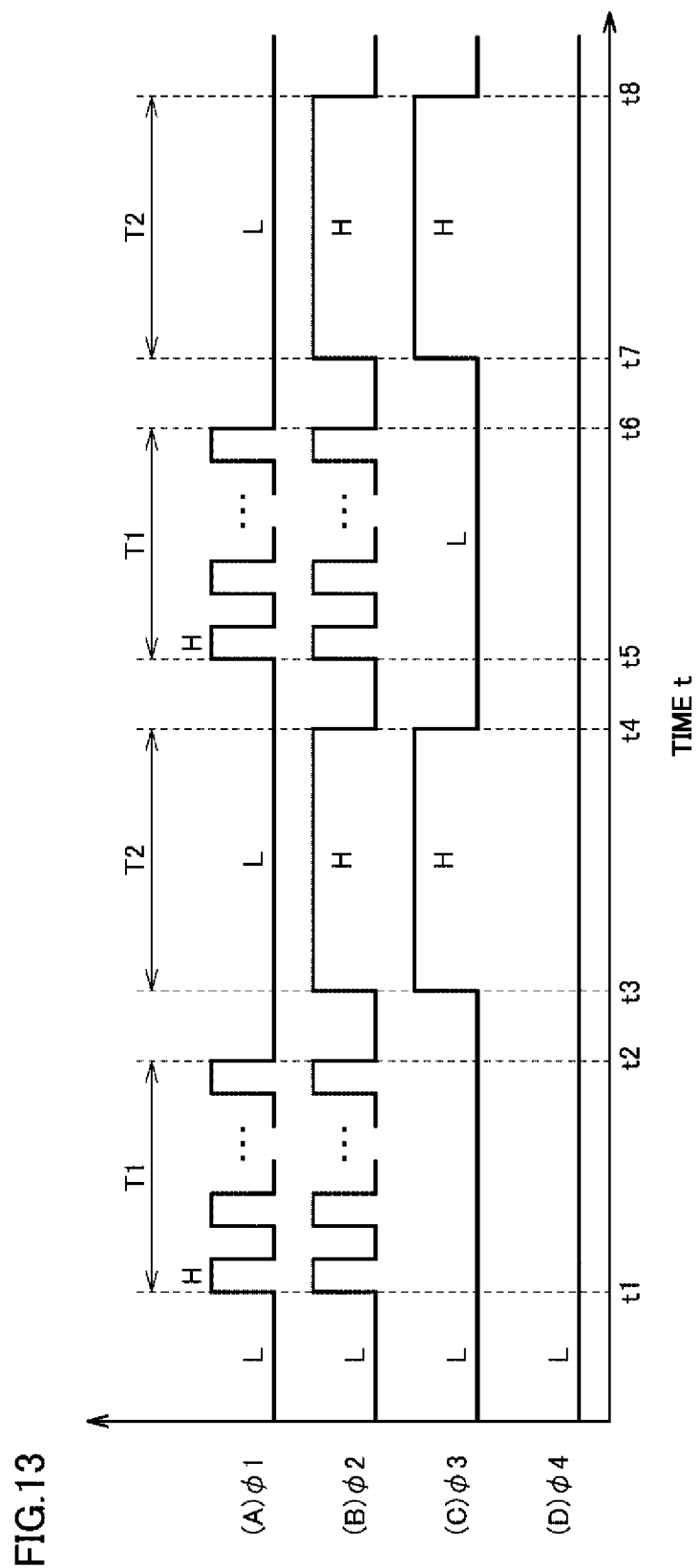
FIG. 13 is another time chart showing the operation of control unit 53 shown in FIG. 6.

It can be understood from FIG. 10 that the switching patterns of the IGBT devices of the phase arm have three modes. FIG. 11 is a diagram showing the switching patterns of four IGBT devices included in each phase arm of converter 3 shown in FIG. 3. FIGS. 12(A) to 12(C) are circuit diagrams showing the operation of each phase arm in the modes shown in FIG. 11.

FIG. 12(A) shows Mode 1. In Mode 1, IGBT devices Q1 and Q2 turn on, and positive-side smoothing capacitor C1 is charged (or discharged). FIG. 12(B) shows Mode 2. In Mode 2, IGBT devices Q2 and Q3 turn on, and the power storage state of positive-side smoothing capacitor C1 and negative-side smoothing capacitor C2 is not changed so much. FIG. 12(C) shows Mode 3. In Mode 3, IGBT devices Q3 and Q4 turn on, and negative-side smoothing capacitor C2 is charged (or discharged). In FIGS. 12(A) and 12(C), the arrow shows the direction of current flowing during charging. During discharging, current flows in the opposite direction to the arrow.

In converter 3, IGBT devices Q1 and Q2 constitute a first switching element, IGBT devices Q3 and Q4 constitute a second switching element, diodes D1 and D2 constitute a first rectifying element, and diodes D3 and D4 constitute a second rectifying element. IGBT devices Q2 and Q3 and diodes D5 and D6 constitute an AC switch.

FIGS. 13(A) to 13(D) are other time charts showing the operation of control unit 53 shown in FIG. 6. FIGS. 13(A) to 13(D) show control of one phase (for example, R phase) of converter 3 (three-level PWM converter) when the absolute value of $\Delta E$ exceeds threshold voltage ETH and Ep>En in a power failure of commercial AC power supply 41. FIGS. 13(A) to 13(D) show the waveforms of control signals $\phi 1$ to $\phi 4$ for controlling IGBT devices Q1 to Q4 of one phase of converter 3 in that case. Control signals $\phi 1$ to $\phi 4$ are generated by balance control circuit 66 (FIG. 6).

When power failure signal PC goes to "H" level that is the active level and the absolute value of DC voltage $\Delta E$=Ep−En exceeds threshold voltage ETH, output signal DT of determiner 65 (FIG. 6) goes to "H" level that is the active level. When signal DT is brought to "H" level, balance control circuit 66 is activated, and switch circuit 67 connects balance control circuit 66 to converter 3. Output signals $\phi 1$ to $\phi 4$ of balance control circuit 66 are applied to the gates of IGBT devices Q1 to Q4 of converter 3 through switch circuit 67.

When $\Delta E$>0 (that is, when Ep>En), first, control signals $\phi 1$ and $\phi 2$ are brought to "H" level and "L" level at a frequency fc for a predetermined period of time T1, and control signals $\phi 3$ and $\phi 4$ are fixed to "L" level (time t1 to t2).

Figure 14:
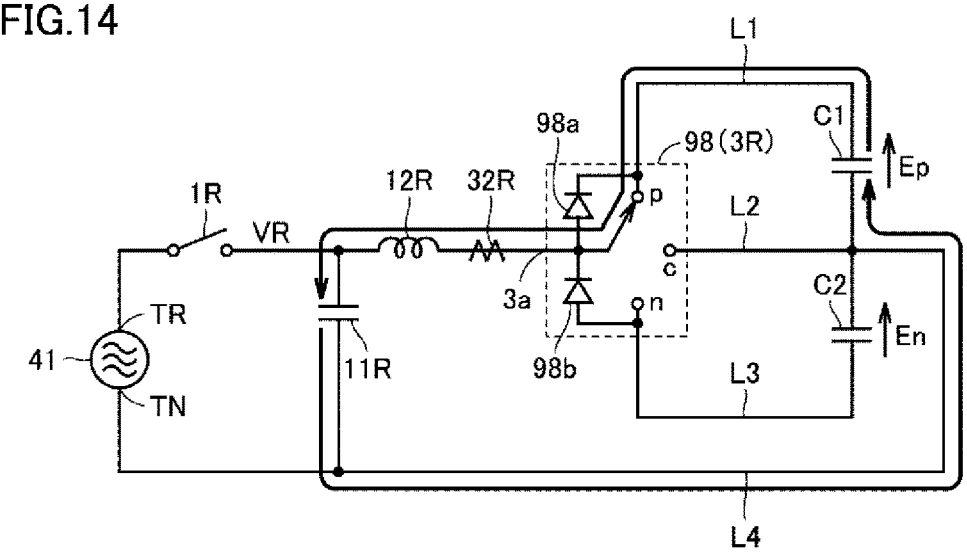
FIG. 14 is an equivalent circuit diagram showing the operation of one phase of the converter when Ep>En.

When control signals $\phi 1$ and $\phi 2$ are brought to "H" level, IGBT devices Q1 and Q2 turn on (Mode 1), and as shown in FIG. 14, switch 98 (R-phase arm 3R) connects DC line L1 to input node 3a. Thus, current flows from the positive electrode of capacitor C1 to the negative electrode of capacitor C1 through DC line L1, switch 98 (R-phase arm 3R), input node 3a, reactor 12R, capacitor 11R, and neutral line L4. Since the capacitance value of capacitor C1 is sufficiently larger than the capacitance value of capacitor 11R, terminal-to-terminal voltage Ep of capacitor C1 slightly decreases. Thus, $\Delta E$=Ep−En is slightly reduced. At this time, electromagnetic energy is stored into reactor 12R.

Figure 15:
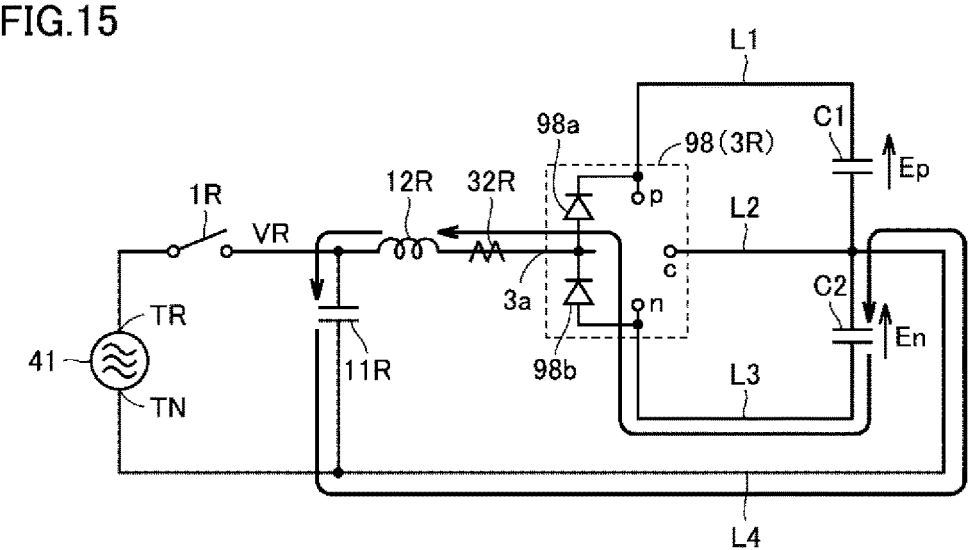
FIG. 15 is another equivalent circuit diagram showing the operation of one phase of the converter when Ep>En.

Subsequently, when control signals $\phi 1$ and $\phi 2$ are brought to "L" level, IGBT devices Q1 and Q2 turn off, and as shown in FIG. 15, current flows from one terminal of reactor 12R to the other terminal of reactor 12R through capacitor 11R, neutral line L4, capacitor C2, and diode 98b. At this time, electromagnetic energy of reactor 12R is emitted, capacitor C2 is charged, and terminal-to-terminal voltage En of capacitor C2 slightly rises. Thus, $\Delta E$=Ep−En is slightly reduced.

In this way, by repeating the operation of bringing control signals $\phi 1$ and $\phi 2$ to "H" level and "L" level and turning on and off IGBT devices Q1 and Q2, $\Delta E$=Ep−En is gradually reduced. As can be understood from FIG. 14, when terminal-to-terminal voltage VR of capacitor 11R rises and reaches voltage Ep of DC line L1, capacitor C1 is unable to be discharged even by turning on IGBT devices Q1 and Q2.

Figure 16:
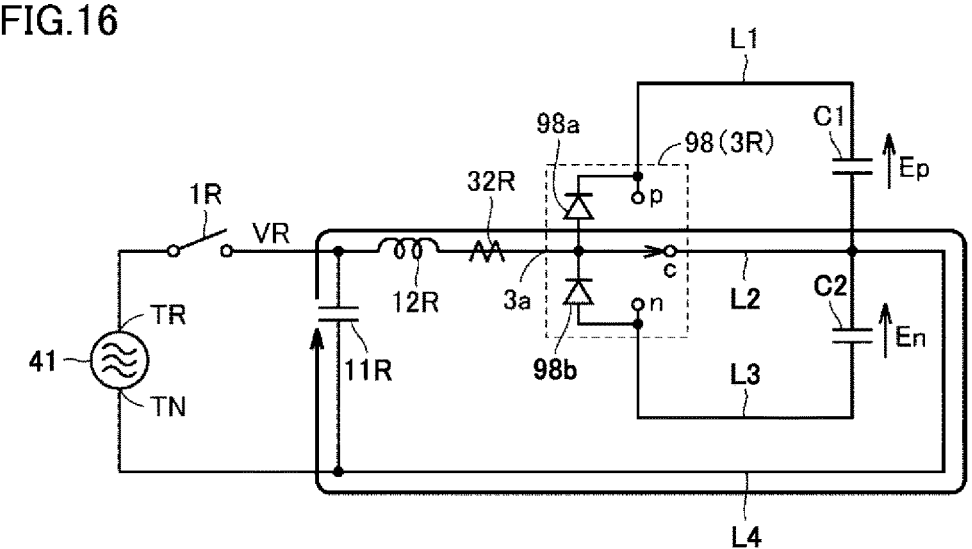
FIG. 16 is yet another equivalent circuit diagram showing the operation of one phase of the converter when Ep>En.
Figure 17:
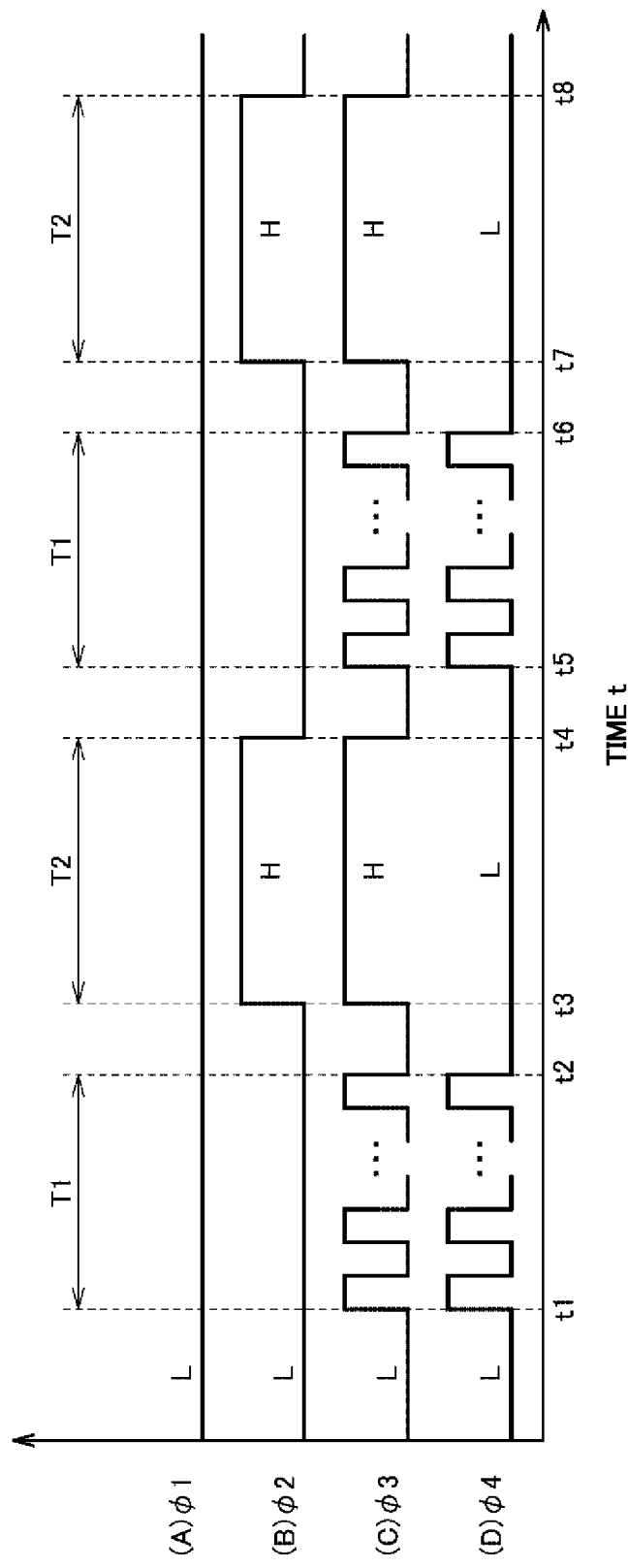
FIG. 17 is yet another time chart showing the operation of control unit 53 shown in FIG. 6.

Then, in the present first embodiment, after control signals $\phi 1$ and $\phi 2$ are brought to "H" level and "L" level at a predetermined frequency fc for a predetermined period of time T1, as shown in FIGS. 13(A) to 13(D), control signals $\phi 2$ and $\phi 3$ are brought to "H" level for a predetermined period of time T2. When control signals $\phi 2$ and $\phi 3$ are brought to "H" level, IGBT devices Q2 and Q3 turn on (Mode 2), and as shown in FIG. 16, current flows from one electrode of capacitor 11R to the other electrode of capacitor 11R through reactor 12R, input node 3a, switch 98 (R-phase arm 3R), DC line L2, and neutral line L4. Terminal-to-terminal voltage VR of capacitor 11R then turns from positive polarity to negative polarity (VR=−Ep), allowing capacitor C1 to be discharged again.

In this way, in a power failure of commercial AC power supply 41, when the absolute value of $\Delta E$ exceeds threshold voltage ETH and Ep>En, as shown in FIGS. 13(A) to 13(D), the operation of bringing control signals $\phi 1$ and $\phi 2$ to "H" level and "L" level at a predetermined frequency fc for a predetermined period of time T1 (first operation) and the operation of bringing control signals $\phi 2$ and $\phi 3$ to "H" level for a predetermined period of time T2 (second operation) are alternately repeated.

For example, when the absolute value of $\Delta E$ is smaller than threshold voltage ETH, output signal DT of determiner 65 (FIG. 6) goes to "L" level that is the inactive level, balance control circuit 66 is deactivated, all of control signals $\phi 1$ to $\phi 4$ are brought to "L" level, and IGBT devices Q1 to Q4 are turned off. Switch circuit 67 (FIG. 6) connects converter 3 to PWM circuit 64 instead of balance control circuit 66.

FIGS. 17(A) to 17(D) are other time charts showing the operation of control unit 53 shown in FIG. 6, in comparison with FIGS. 13(A) to 13(D). FIGS. 13(A) to 13(D) show the operation when $\Delta E$>0 (that is, when Ep>En), whereas FIGS. 17(A) to 17(D) show the operation when $\Delta E$<0 (that is, when Ep<En).

When $\Delta E$<0 (that is, when Ep<En), first, control signals $\phi 3$ and $\phi 4$ are brought to "H" level and "L" level at a predetermined frequency fc for a predetermined period of time T1, and control signals $\phi 1$ and $\phi 2$ are fixed to "L" level (time t1 to t2).

Figure 18:
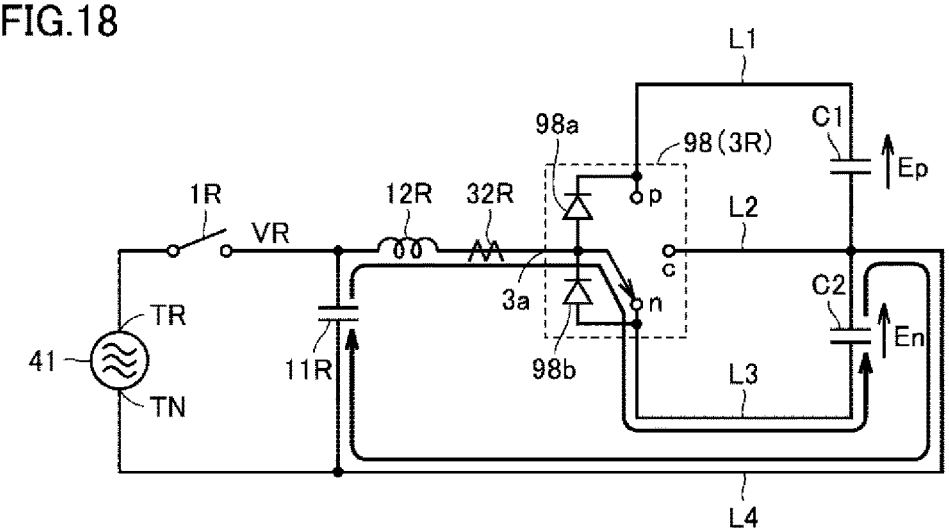
FIG. 18 is an equivalent circuit diagram showing the operation of one phase of the converter when Ep<En.

When control signals $\phi 3$ and $\phi 4$ are brought to "H" level, IGBT devices Q3 and Q4 turn on (Mode 3), and as shown in FIG. 18, switch 98 (R-phase arm 3R) connects input node 3a to DC line L3. Thus, current flows from the positive electrode of capacitor C2 to the negative electrode of capacitor C2 through neutral line L4, capacitor 11R, reactor 12R, input node 3a, switch 98 (R-phase arm 3R), and DC line L3. Since the capacitance value of capacitor C2 is sufficiently larger than the capacitance value of capacitor 11R, terminal-to-terminal voltage En of capacitor C2 slightly decreases. Thus, $\Delta E$=En−Ep is slightly reduced. At this time, electromagnetic energy is stored into reactor 12R.

Figure 19:
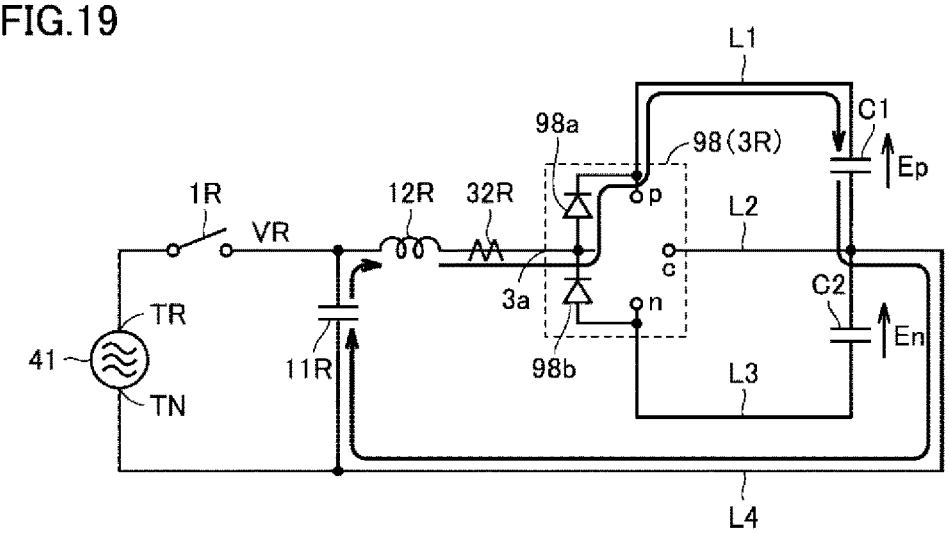
FIG. 19 is another equivalent circuit diagram showing the operation of one phase of the converter when Ep<En.

Subsequently, when control signals $\phi 3$ and $\phi 4$ are brought to "L" level, IGBT devices Q3 and Q4 turn off, and as shown in FIG. 19, current flows from the other terminal of reactor 12R to one terminal of reactor 12R through diode 98a, DC line L1, capacitor C1, neutral line L4, and capacitor 11R. At this time, electromagnetic energy of reactor 12R is emitted, capacitor C1 is charged, and terminal-to-terminal voltage Ep of capacitor C1 slightly rises. Thus, ΔE=En−Ep is slightly reduced.

In this way, by repeating the operation of bringing control signals φ3 and φ4 to "H" level and "L" level and turning on and off IGBT devices Q3 and Q4, ΔE=En−Ep is gradually reduced. As can be understood from FIG. 18, when terminal-to-terminal voltage VR of capacitor 11R decreases and reaches voltage (−En) of DC line L3, capacitor C2 is unable to be discharged even by turning on IGBT devices Q3 and Q4.

Figure 20:
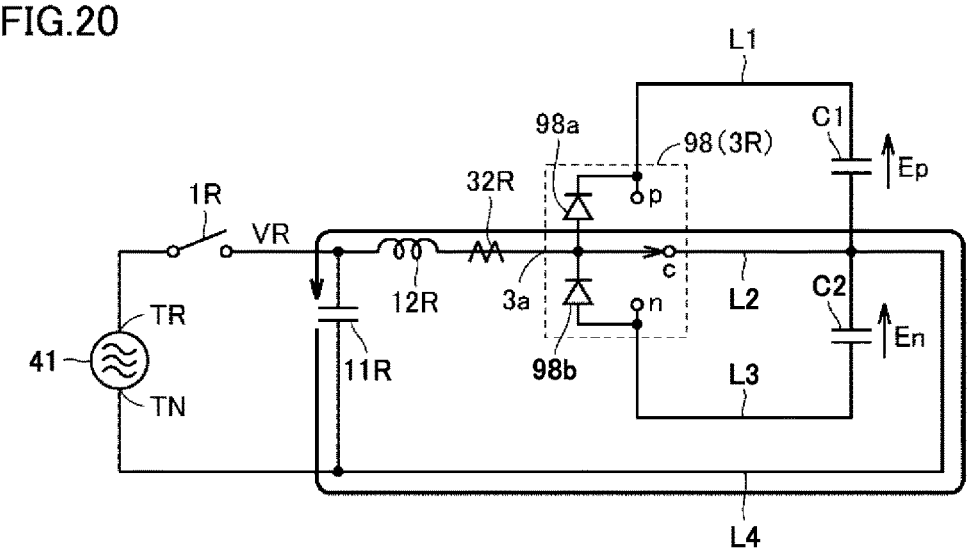
FIG. 20 is yet another equivalent circuit diagram showing the operation of one phase of the converter when Ep<En.

Then, in the present first embodiment, after control signals φ3 and φ4 are brought to "H" level and "L" level at a predetermined frequency fc for a predetermined period of time T1, as shown in FIGS. 17(A) to 17(D), control signals φ2 and φ3 are brought to "H" level for a predetermined period of time T2. When control signals φ2 and φ3 are brought to "H" level, IGBT devices Q2 and Q3 turn on (Mode 2), and as shown in FIG. 20, current flows from the other electrode of capacitor 11R to one electrode of capacitor 11R through neutral line L4, DC line L2, switch 98 (R-phase arm 3R), input node 3a, and reactor 12R. Terminal-to-terminal voltage VR of capacitor 11R then turns from negative polarity to positive polarity (VR=En), allowing capacitor C2 to be discharged again.

In this way, in a power failure of commercial AC power supply 41, when the absolute value of ΔE exceeds threshold voltage ETH and Ep<En, as shown in FIGS. 17(A) to 17(D), the operation of bringing control signals φ3 and φ4 to "H" level and "L" level at a predetermined frequency fc for a predetermined period of time T1 (third operation) and the operation of bringing control signals φ2 and φ3 to "H" level for a predetermined period of time T2 (fourth operation) are alternately repeated.

For example, when the absolute value of ΔE is smaller than threshold voltage ETH, output signal DT of determiner 65 (FIG. 6) goes to "L" level that is the inactive level, balance control circuit 66 is deactivated, all of control signals φ1 to φ4 are brought to "L" level, and IGBT devices Q1 to Q4 are turned off. Switch circuit 67 (FIG. 6) connects converter 3 to PWM circuit 64 instead of balance control circuit 66.

The balance control by converter 3 in a sound state of commercial AC power supply 41 will now be described. In a sound state of commercial AC power supply 41, output signal DT of determiner 65 (FIG. 6) goes to "L" level that is the inactive level, and switch circuit 67 couples PWM circuit 64 to converter 3. In FIG. 10, when Ep<En, in order to achieve voltage balance between smoothing capacitors C1 and C2, balance control circuit 62 adds adjustment signal Vc1 to voltage command signal 103 to adjust a voltage command signal to voltage command signal 104.

In PWM circuit 64, the levels of voltage command signal 104 and reference signals 101, 102 are compared, whereby the switching patterns 121 to 124 of IGBT devices Q1 to Q4 are obtained. In a time period in which voltage command signal 104 is positive, positive-side smoothing capacitor C1 is charged. In a time period in which voltage command signal 104 is negative, negative-side smoothing capacitor C2 is charged.

When the switching patterns (111 to 114) without correction are compared with the switching patterns (121 to 124) with correction, the charging period of positive-side smoothing capacitor C1 is longer than the charging period of negative-side smoothing capacitor C2, so that voltage Ep can be raised relative to voltage En. Since adjustment signal Vc1 is output such that Ep=En is achieved, the voltages of smoothing capacitors C1 and C2 are matched and balanced.

In FIG. 10, when Ep>En, in order to achieve voltage balance between smoothing capacitors C1 and C2, balance control circuit 62 adds adjustment signal Vc2 to voltage command signal 103 to adjust a voltage command signal to voltage command signal 105. In PWM circuit 64, the levels of voltage command signal 105 and reference signals 101, 102 are compared, whereby the switching patterns 131 to 134 of IGBT devices Q1 to Q4 are obtained.

In a time period in which voltage command signal 104 is positive, positive-side smoothing capacitor C1 is charged. In a time period in which voltage command signal 104 is negative, negative-side smoothing capacitor C2 is charged. When the switching patterns (111 to 114) without correction are compared with the switching patterns (131 to 134) with correction, the charging period of negative-side smoothing capacitor C2 is longer than the charging period of positive-side smoothing capacitor C1, so that voltage En can be raised relative to voltage Ep. Since adjustment signal Vc2 is output such that Ep=En is achieved, the voltages of smoothing capacitors C1 and C2 are matched and balanced.

The balance control by converter 3 when the absolute value of ΔE exceeds threshold value ETH in a power failure of commercial AC power supply 41 will now be described. In a power failure of commercial AC power supply 41, when the absolute value of ΔE exceeds threshold voltage ETH, output signal DT of determiner 65 (FIG. 6) goes to "H" level that is the active level, and switch circuit 67 couples balance control circuit 66 to converter 3.

In FIG. 13 to FIG. 16, when Ep>En, in order to achieve voltage balance between smoothing capacitors C1 and C2, balance control circuit 66 alternately repeats the first operation of turning on and off IGBT devices Q1 and Q2 at a predetermined frequency fc for a predetermined period of time T1 and the second operation of turning on IGBT devices Q2 and Q3 for a predetermined period of time T2.

When IGBT devices Q1 and Q2 are turned on, current flows out of capacitor C1 to capacitor C3, so that terminal-to-terminal voltage Ep of capacitor C1 is slightly reduced and electromagnetic energy is stored into reactor 12R. When IGBT devices Q1 and Q2 are turned off, electromagnetic energy stored in reactor 12R is emitted, so that capacitor C2 is charged, and terminal-to-terminal voltage En of capacitor C2 slightly rises. When IGBT devices Q2 and Q3 are turned on, reactor 12R is connected between the terminals of capacitor 11R, and the polarity of terminal-to-terminal voltage VR of capacitor 11R is reversed, enabling execution of the first operation.

By alternately repeating the first and second operations described above, ΔE=Ep−En is gradually reduced. When the absolute value of ΔE becomes lower than threshold voltage ETH, output signal DT of determiner 65 (FIG. 6) goes to "L" level that is the inactive level, balance control circuit 66 is deactivated so that IGBT devices Q1 to Q4 are turned off, and switch circuit 67 couples PWM circuit 64 to converter 3.

In FIG. 17 to FIG. 20, when Ep<En, in order to achieve voltage balance between smoothing capacitors C1 and C2, balance control circuit 66 alternately repeats the third operation of turning on and off IGBT devices Q3 and Q4 at a predetermined frequency fc for a predetermined period of time T1 and the fourth operation of turning on IGBT devices Q2 and Q3 for a predetermined period of time T2.

When IGBT devices Q3 and Q4 are turned on, current flows out of capacitor C2 to capacitor C3, so that terminal-to-terminal voltage En of capacitor C2 slightly decreases, and electromagnetic energy is stored into reactor 12R. When IGBT devices Q3 and Q4 are turned off, electromagnetic energy stored in reactor 12R is emitted so that capacitor C1 is charged, and terminal-to-terminal voltage Ep of capacitor C2 slightly rises. When IGBT devices Q2 and Q3 are turned on, reactor 12R is connected between the terminals of capacitor 11R, and the polarity of terminal-to-terminal voltage VR of capacitor 11R is reversed, enabling execution of the fourth operation.

By alternately repeating the third and fourth operations described above, ΔE=En−Ep is gradually reduced. When the absolute value of ΔE becomes lower than threshold voltage ETH, output signal DT of determiner 65 (FIG. 6) goes to "L" level that is the inactive level, balance control circuit 66 is deactivated so that IGBT devices Q1 to Q4 are turned off, and switch circuit 67 couples PWM circuit 64 to converter 3.

FIG. 21 is a time chart showing the operation of control unit 54 shown in FIG. 8. In FIG. 21, voltage command signal 154 is a voltage command signal (V*) in a state not corrected by balance control circuit 82 (FIG. 8).

When Ep<En, voltage command value (VB1*) indicated by adjustment signal Vc1 is positive. In this case, balance control circuit 82 adds adjustment signal Vc1 to voltage command signal 154 to change the voltage command signal (VA*) of IGBT devices Q1D and Q3D to voltage command signal 153. Balance control circuit 82 subtracts adjustment signal Vc1 from command signal 154 to change the voltage command signal (VB*) of IGBT devices Q2D and Q4D to the corrected voltage command signal 155.

Figure 23:
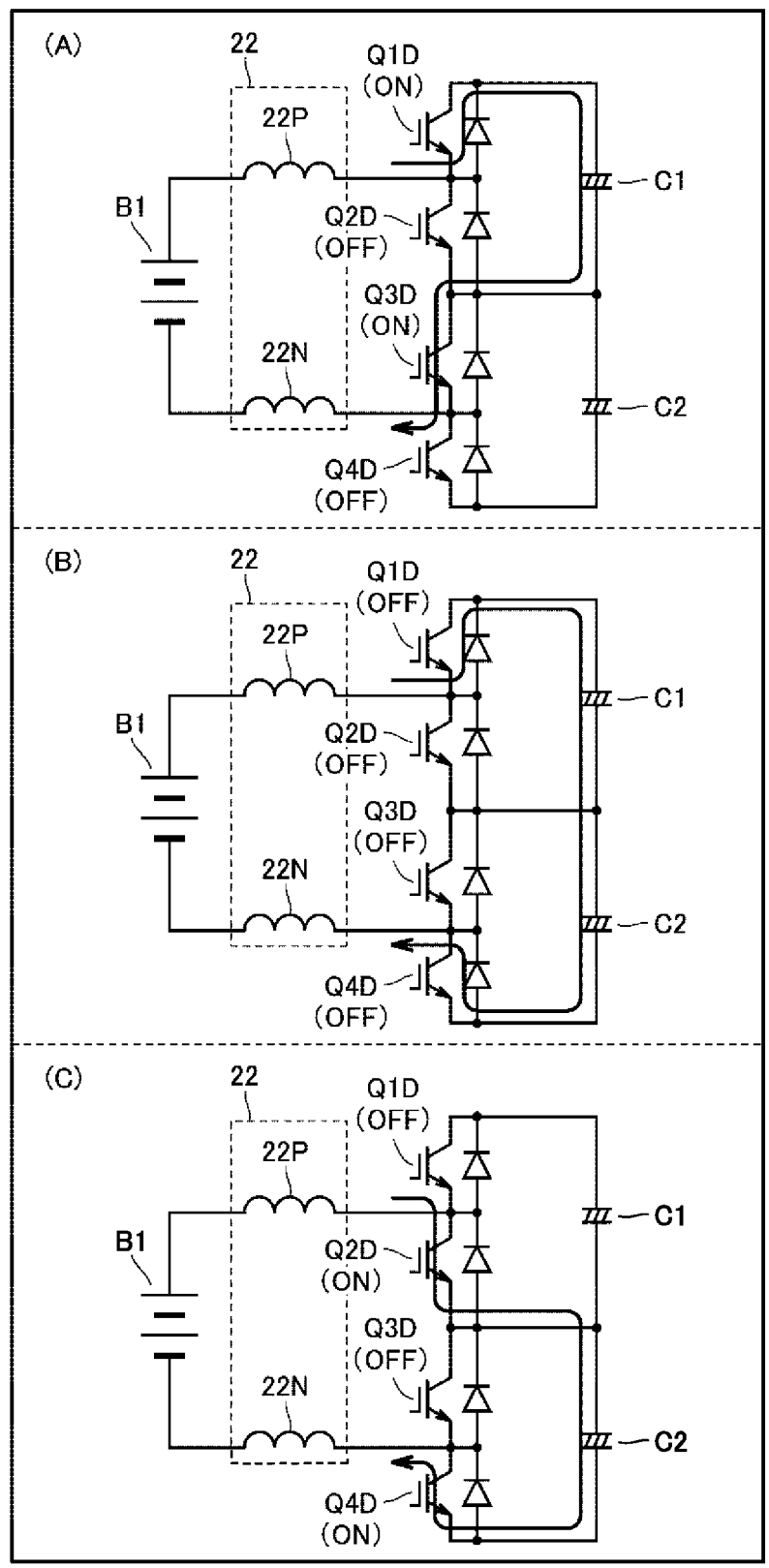
FIG. 23 is a circuit diagram showing the operation of the DC voltage converter in three modes shown in FIG. 22.

It can be understood from FIG. 21 that the switching patterns of four IGBT devices Q1D to Q4D included in semiconductor switch 21 (FIG. 4) have three modes. FIG. 22 is a diagram showing the switching patterns of IGBT devices Q1D to Q4D shown in FIG. 4. FIGS. 23(A) to 23(C) are circuit diagrams showing the operation of DC voltage converter 6 in three modes shown in FIG. 22.

FIG. 23(A) shows Mode 1. In Mode 1, IGBT devices Q1D and Q3D turn on, and positive-side smoothing capacitor C1 is charged. FIG. 23(B) shows Mode 2. In Mode 2, IGBT devices Q1D to Q4D turn off, and the power storage state of positive-side smoothing capacitor C1 and negative-side smoothing capacitor C2 is not changed so much. FIG. 23(C) shows Mode 3. In Mode 3, IGBT devices Q2D and Q4D turn on, and negative-side smoothing capacitor C2 is charged.

Returning to FIG. 21, in PWM circuit 85 (FIG. 8), the levels of voltage command signal 154 and reference signal 151 are compared, whereby switching patterns 161 and 163 of IGBT devices Q1 and Q3 are obtained. In PWM circuit 85, the levels of voltage command signal 154 and reference signal 152 are compared, whereby switching patterns 162 and 164 of IGBT devices Q2 and Q4 are obtained.

Reference signals 151 and 152 are both triangular wave signals. The frequency and the amplitude of reference signal 151 are the same as the frequency and the amplitude of reference signal 152. Reference signal 151 and reference signal 152 are out of phase by 180 degrees.

In a time period Ta in which the level of reference signal 151 is lower than the level of voltage command signal 154, IGBT devices Q1 and Q3 are turned on (Mode 1). In a time period in which the levels of reference signals 151 and 152 are higher than the level of voltage command signal 154, IGBT devices Q1 to Q4 are turned off (Mode 2). In a time period Tb in which the level of reference signal 152 is lower than the level of voltage command signal 154, IGBT devices Q2 and Q4 are turned on (Mode 3).

That is, in time period Ta of the periods of reference signal 151, IGBT devices Q1D to Q4D are operated in Mode 1, so that positive-side smoothing capacitor C1 is charged. In time period Tb of the periods of reference signal 152, IGBT devices Q1D to Q4D are operated in Mode 3, so that negative-side smoothing capacitor C2 is charged.

When Ep<En, the levels of voltage command signal 153 and reference signal 151 are compared, whereby switching patterns 171 and 173 of IGBT devices Q1D and Q3D are obtained. The levels of voltage command signal 155 and reference signal 152 are compared, whereby switching patterns 172 and 174 of IGBT devices Q2D and Q4D are obtained. In this case, as shown in FIG. 21, in time period Tc of periods T of reference signal 151, IGBT devices Q1D to Q4D are operated in Mode 1, so that positive-side smoothing capacitor C1 is charged. In time period Td of periods T of reference signal 152, IGBT devices Q1D to Q4D are operated in Mode 3, so that negative-side smoothing capacitor C2 is charged.

When the switching patterns (161 to 164) without correction are compared with the switching patterns (171 to 174) with correction, the charging period (Tc) of positive-side smoothing capacitor C1 is longer than the charging period (Td) of negative-side smoothing capacitor C2, so that voltage Ep can be raised relative to voltage En. Since adjustment signal Vc1 is output such that Ep=En is achieved, the voltages of smoothing capacitors C1 and C2 are matched and balanced.

Figure 24:
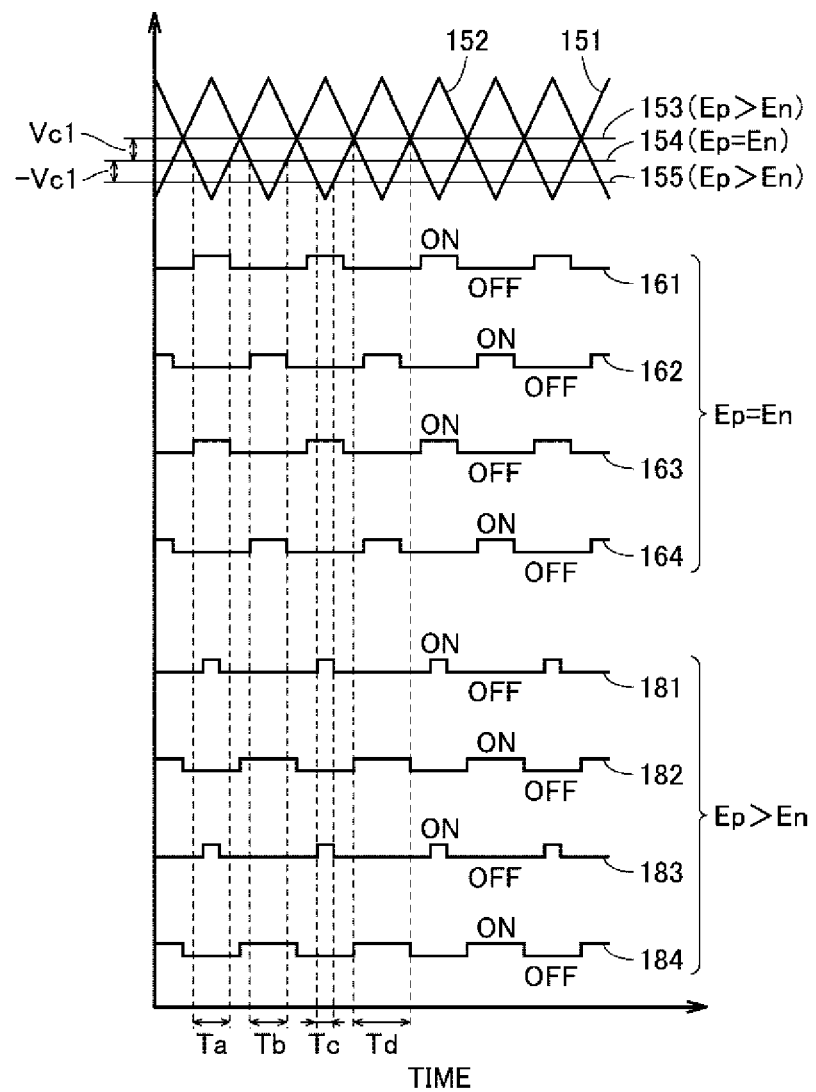
FIG. 24 is another time chart showing the operation of control unit 54 shown in FIG. 8.

FIG. 24 is another time chart showing the operation of control unit 54 shown in FIG. 7. In FIG. 24, voltage command signal 154 is a voltage command signal (V*) in a state not corrected by balance control circuit 82 (FIG. 8).

When Ep>En, the voltage command value (VB1*) indicated by adjustment signal Vc1 is negative. In this case, balance control circuit 82 adds adjustment signal Vc1 to voltage command signal 154 to change the voltage command signal (VA*) of IGBT devices Q1D and Q3D to voltage command signal 155. Balance control circuit 82 subtracts adjustment signal Vc1 from command signal 154 to change the voltage command signal (VB*) of IGBT devices Q2D and Q4D to the corrected voltage command signal 153.

In this case, the levels of voltage command signal 155 and reference signal 151 are compared in PWM circuit 85, whereby switching patterns 181 and 183 shown in FIG. 24 are obtained as the switching patterns of IGBT devices Q1D and Q3D. The levels of voltage command signal 153 and reference signal 152 are compared in PWM circuit 85, whereby switching patterns 182 and 184 shown in FIG. 24 are obtained as the switching patterns of IGBT devices Q2D and Q4D.

When Ep>En, as shown in FIG. 24, in time period Tc of the periods of reference signal 151, IGBT devices Q1D to Q4D are operated in Mode 1, so that positive-side smoothing capacitor C1 is charged. In time period Td of the periods of reference signal 152, IGBT devices Q1D to Q4D are operated in Mode 3, so that negative-side smoothing capacitor C2 is charged.

When the switching patterns (161 to 164) without correction are compared with the switching patterns (181 to 184) with correction, the charging period (Tc) of positive-side smoothing capacitor C1 is shorter than the charging period (Td) of negative-side smoothing capacitor C2, so that voltage En can be raised relative to voltage Ep. Since adjustment signal Vc1 is output such that Ep=En is achieved, the voltages of smoothing capacitors C1 and C2 are matched and balanced.

The operation of uninterruptible power supply apparatus U1 shown in FIG. 1 to FIG. 24 will now be described. In a sound state of commercial AC power supply 41, switch 1 is turned on, and three-phase AC power from commercial AC power supply 41 is supplied to converter 3 through switch 1 and AC input filer 2 and is converted to DC power by converter 3. The DC power is stored into battery B1 by DC voltage converter 6 and converted to three-phase AC power by inverter 4. The three-phase AC power generated by inverter 4 is supplied to load 42 through AC output filter 5 to drive load 42.

At this time, converter 3 is controlled by control unit 53 (FIG. 6) such that voltage VDC=Ep+En that is the sum of terminal-to-terminal voltages Ep and En of capacitors C1 and C2 becomes reference DC voltage VDCr and voltage ΔE=Ep−En that is the difference between terminal-to-terminal voltages Ep and En of capacitors C1 and C2 becomes zero.

In a power failure of commercial AC power supply 41, basically, switch 1 is turned off, the operation of converter 3 is stopped, and DC power of battery B1 is supplied to inverter 4 through DC voltage converter 6 and converted to three-phase AC power having a commercial frequency by inverter 4. The three-phase AC power generated by inverter 4 is supplied to load 42 through AC output filter 5 to drive load 42.

At this time, DC voltage converter 6 is controlled by control unit 54 (FIG. 8) such that voltage VDC=Ep+En that is the sum of terminal-to-terminal voltages Ep and En of capacitors C1 and C2 becomes reference DC voltage VDCr and voltage ΔE=Ep−En that is the difference between terminal-to-terminal voltages Ep and En of capacitors C1 and C2 becomes zero.

However, when load 42 includes three-phase four-wire transformer 43 and load body 46 as shown in FIG. 2, three-phase excitation current flows through transformer 43, and each of three phase output currents of uninterruptible power supply apparatus U1 has a positive-negative asymmetric waveform. When all of the AC power supply, the uninterruptible power supply apparatus, the three-phase transformer, and the load body are three-phase three-wire systems, the sum of three phase AC currents flowing through the three-phase transformer is zero and therefore it is less likely that terminal-to-terminal voltages Ep and En of capacitors C1 and C2 are unbalanced.

However, in the present first embodiment, since commercial AC power supply 41, uninterruptible power supply apparatus U1, transformer 43, and load body 46 are three-phase four-wire systems and current flows through neutral line L4, the sum of three phase AC currents flowing through transformer 43 is not zero and it is likely that terminal-to-terminal voltages Ep and En of capacitors C1 and C2 are unbalanced. In particular when load current is small and in a power failure of commercial AC power supply 41, output current of DC voltage converter 6 is small and the unbalance between terminal-to-terminal voltages Ep and En of capacitors C1 and C2 may be unable to be eliminated.

Then, in the present first embodiment, in a power failure of commercial AC power supply 41, when the absolute value of voltage ΔE=Ep−En that is the difference between terminal-to-terminal voltages Ep and En of capacitors C1 and C2 exceeds predetermined threshold voltage ETH, converter 3 is activated. When Ep>En, converter 3 discharges capacitor C1 and charges capacitor C2. When Ep<En, converter 3 discharges capacitor C2 and charges capacitor C1 and reduces voltage ΔE=Ep−En that is the difference between terminal-to-terminal voltages Ep and En of capacitors C1 and C2. When ΔE=Ep−En becomes lower than predetermined threshold voltage ETH, the operation of converter 3 is stopped.

As described above, in the present first embodiment, in a power failure of commercial AC power supply 41, switch 1 is turned off to electrically cut off commercial AC power supply 41 from AC input filter 2, DC voltage converter 6 is controlled such that DC voltage ΔE=Ep−En that is the difference between terminal-to-terminal voltages Ep and En of capacitors C1 and C2 is removed, and when ΔE exceeds threshold voltage ETH, converter 3 is controlled to reduce ΔE. Therefore, even when load 42 includes three-phase four-wire transformer 43 and load body 46, and load current is small, the unbalance between terminal-to-terminal voltages Ep and En of capacitors C1 and C2 in a power failure can be eliminated.

Second Embodiment

In the first embodiment, when Ep>En, balance control circuit 66 (FIG. 6) alternately performs the first operation of turning on and off IGBT devices Q1 and Q2 at a predetermined frequency fc for a predetermined period of time T1 to discharge capacitor C1 and charge capacitor C2 and the second operation of turning on IGBT devices Q2 and Q3 for a predetermined period of time T2 to discharge capacitor 11R.

However, as can be understood from FIG. 14, after terminal-to-terminal voltage VR of capacitor 11R reaches voltage Ep of DC line L1, that is, after VR=Ep is attained, turning on and off IGBT devices Q1 and Q2 does not change terminal-to-terminal voltages Ep and En of capacitors C1 and C2, resulting in waste of time.

As can be understood from FIG. 16, after terminal-to-terminal voltage VR of capacitor 11R is reversed to attain negative peak value (−Ep), that is, after VR=−Ep is attained, turning on IGBT devices Q2 and Q3 does not increase voltage (Ep−VR) that is the difference between voltage Ep of DC line L1 and terminal-to-terminal voltage VR of capacitor 11R, resulting in waste of time.

In the first embodiment, when Ep<En, balance control circuit 66 alternately performs the third operation of turning on and off IGBT devices Q3 and Q4 at a predetermined frequency fc for a predetermined period of time T1 to discharge capacitor C2 and charge capacitor C1 and the fourth operation of turning on IGBT devices Q3 and Q4 for a predetermined period of time T2 to discharge capacitor 11R.

However, as can be understood from FIG. 18, after terminal-to-terminal voltage VR of capacitor 11R reaches voltage (−En) of DC line L3, that is, after VR=−En is attained, turning on and off IGBT devices Q3 and Q4 does not change terminal-to-terminal voltages Ep and En of capacitors C1 and C2, resulting in waste of time.

As can be understood from FIG. 20, after terminal-to-terminal voltage VR of capacitor 11R is reversed to reach positive peak value En, that is, after VR=En is attained, turning on IGBT devices Q2 and Q3 does not increase voltage [VR−(−En)] that is the difference between terminal-to-terminal voltage VR of capacitor 11R and voltage (−En) of DC line L3, resulting in waste of time (see FIG. 16). The present second embodiment is intended to solve these problems.

Figure 25:
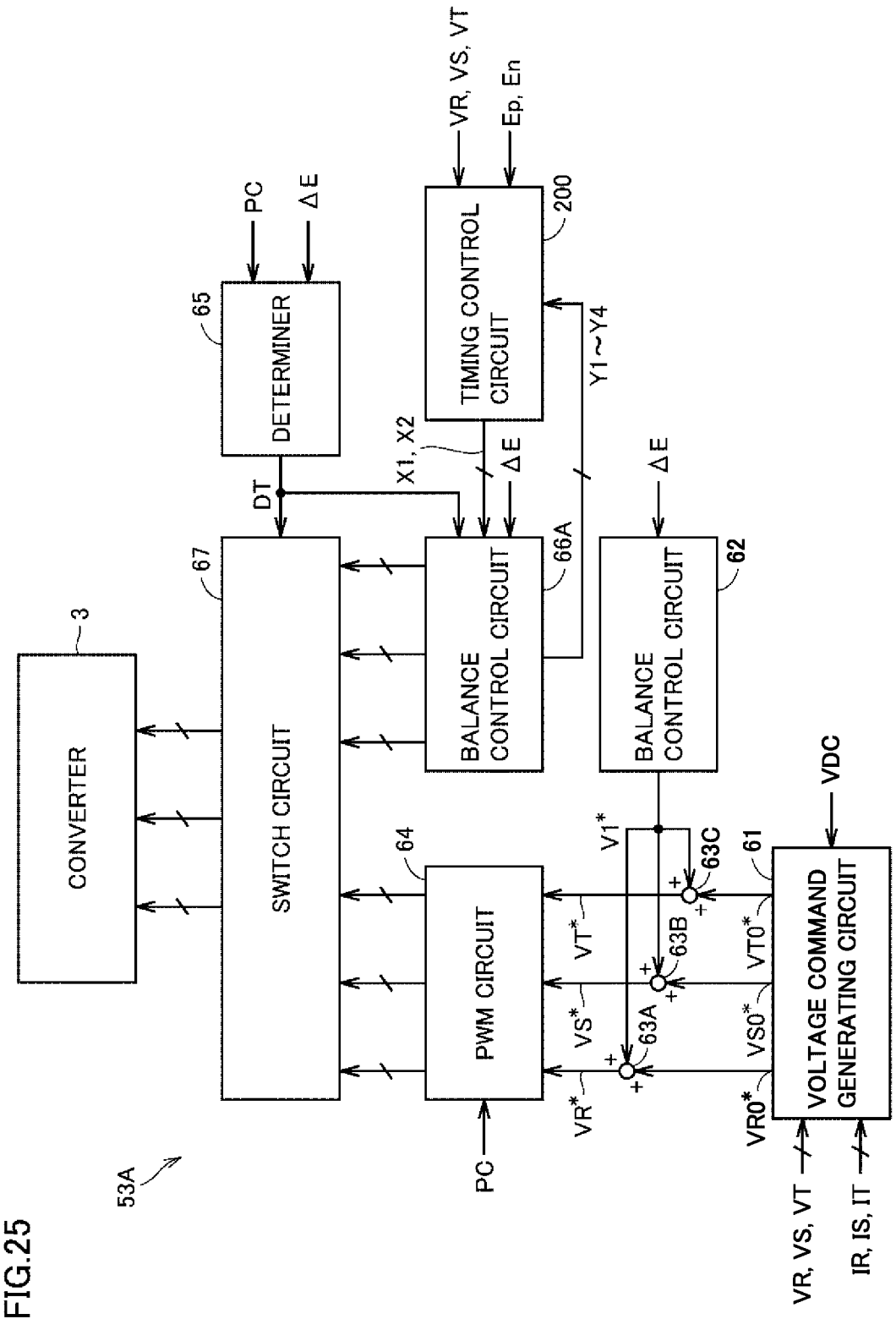
FIG. 25 is a block diagram showing a configuration of a control unit included in the uninterruptible power supply apparatus according to a second embodiment of the present invention.
Figure 26:
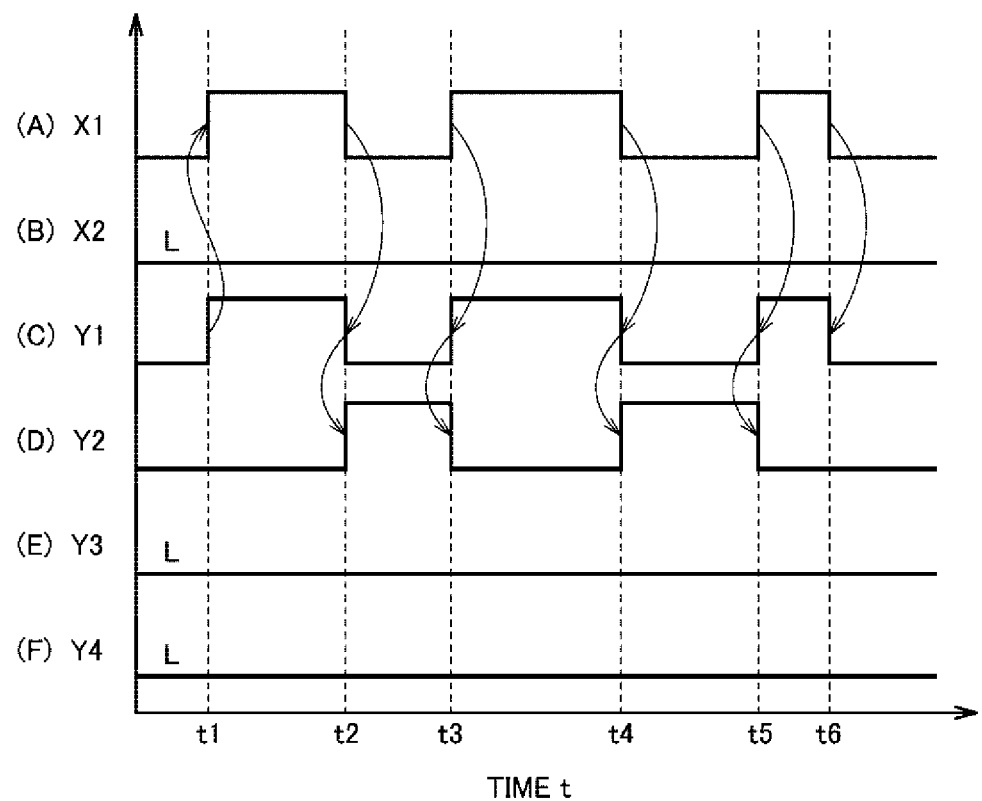
FIG. 26 is a time chart showing the operation of the control unit shown in FIG. 25.
Figure 27:
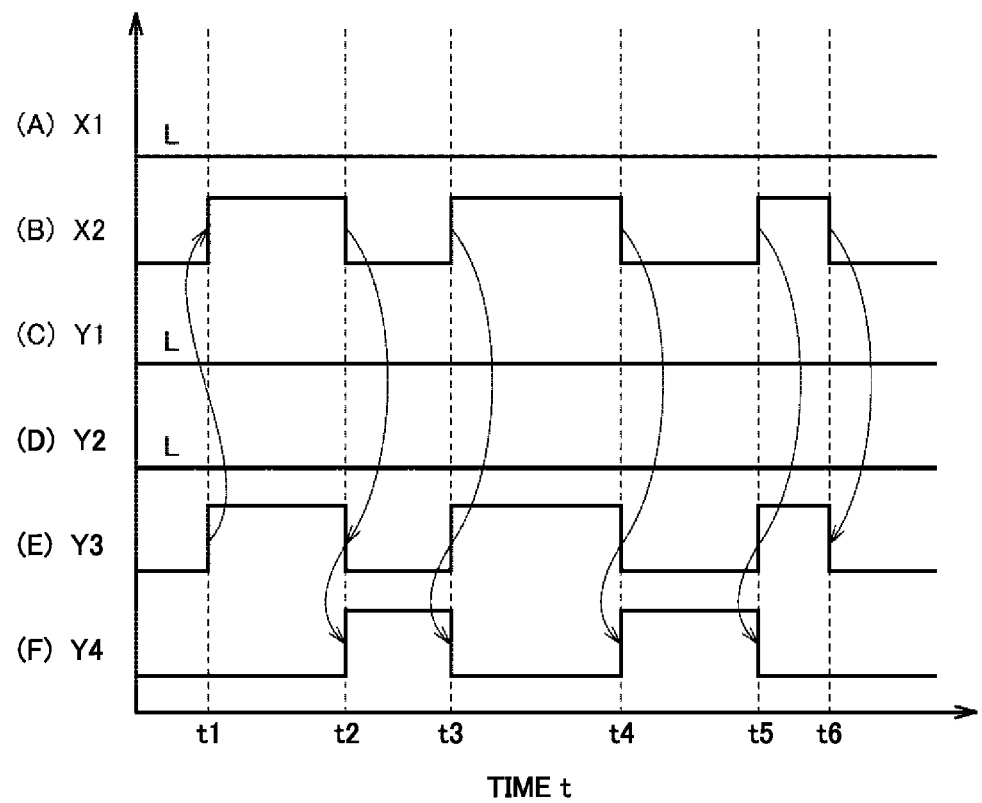
FIG. 27 is another time chart showing the operation of the control unit shown in FIG. 25.

FIG. 25 is a block diagram showing a configuration of a control unit 53A included in the uninterruptible power supply apparatus according to the second embodiment of the present invention, in comparison with FIG. 6. Referring to FIG. 25, this control unit 53A differs from control unit 53 in that a timing control circuit 200 is added and balance control circuit 66 is replaced by a balance control circuit 66A.

Balance control circuit 66A is activated when output signal DT of determiner 65 is brought to "H" level that is the active level, and generates control signals φ1 to φ4 to reduce the absolute value of DC voltage ΔE=Ep−En, in the same manner as balance control circuit 66.

Specifically, in the case where Ep>En, balance control circuit 66A brings control signals φ1 and φ2 to "H" level and "L" level at a predetermined frequency fc when output signal X1 of timing control circuit 200 is "L" level (first operation) and brings control signals φ2 and φ3 to "H" level when signal X1 is "H" level (second operation).

In the case where Ep<En, balance control circuit 66A brings control signals φ3 and φ4 to "H" level and "L" level at a predetermined frequency fc when output signal X2 of timing control circuit 200 is "L" level (third operation) and brings control signals φ2 and φ3 to "H" level when signal X2 is "H" level (fourth operation). During execution of the first to fourth operations, balance control circuit 66A brings each of signals D1 to D4 to "H" level.

In the first operation in which signal Y1 is brought to "H" level, timing control circuit 200 brings signal X1 to "H" level when terminal-to-terminal voltages VR, VS, and VT of capacitors 11R, 11S, and 11T are lower than predetermined threshold voltage VTHp and brings signal X1 to "L" level in response to terminal-to-terminal voltages VR, VS, and VT of capacitors 11R, 11S, and 11T exceeding predetermined threshold voltage VTHp.

Here, threshold voltage VTHp is a predetermined voltage having positive polarity between 0 V and voltage VDCr/2 that is half reference voltage VDCr (FIG. 7). For example, threshold voltage VTHp is set to a voltage slightly lower than VDCr/2. Reference voltage VDCr is a target voltage of DC voltage VDC between DC lines L1 and L3. VDCr/2 is a target voltage of each of Ep and En.

In the second operation in which signal Y2 is brought to "H" level, timing control circuit 200 brings signal X1 to "L" level when terminal-to-terminal voltages VR, VS, and VT of capacitors 11R, 11S, and 11T are higher than predetermined threshold voltage VTHn and brings signal X1 to "H" level in response to terminal-to-terminal voltages VR, VS, and VT of capacitors 11R, 11S, and 11T becoming lower than predetermined threshold voltage VTHn.

Here, threshold voltage VTHn is a predetermined voltage having negative polarity between 0 V and −VDCr/2. For example, threshold voltage VTHn is set to a voltage slightly higher than −VDCr/2.

In the third operation in which signal Y3 is brought to "H" level, timing control circuit 200 brings signal X2 to "H" level when terminal-to-terminal voltages VR, VS, and VT of capacitors 11R, 11S, and 11T are higher than predetermined threshold voltage VTHn and brings signal X2 to "L" level in response to terminal-to-terminal voltages VR, VS, and VT of capacitors 11R, 11S, and 11T becoming lower than predetermined threshold voltage VTHn.

In the fourth operation in which signal Y4 is brought to "H" level, timing control circuit 200 brings signal X2 to "L" level when terminal-to-terminal voltages VR, VS, and VT of capacitors 11R, 11S, and 11T are lower than predetermined threshold voltage VTHp and brings signal X2 to "H" level in response to terminal-to-terminal voltages VR, VS, and VT of capacitors 11R, 11S, and 11T exceeding predetermined threshold voltage VTHp.

FIGS. 26(A) to 26(F) are time charts illustrating the operation of control unit 53A when Ep>En. When output signal DT of determiner 65 (FIG. 25) is brought to "H" level, balance control circuit 66A is activated. Since Ep>En, balance control circuit 66A starts the first operation and raises signal Y1 to "H" level.

When signal Y1 is raised to "H" level, timing control circuit 200 raises signal X1 to "H" level. When the first operation is performed, terminal-to-terminal voltages VR, VS, and VT of capacitors 11R, 11S, and 11T gradually rise.

When all of voltages VR, VS, VT exceed threshold voltage VTHp, timing control circuit 200 lowers control signal X1 to "L" level (time t2). When control signal X1 is lowered to "L" level, balance control circuit 66A stops the first operation and performs the second operation, so that signal Y1 is lowered to "L" level and signal Y2 is raised to "H" level.

When the second operation is performed, terminal-to-terminal voltages VR, VS, and VT of capacitors 11R, 11S, and 11T gradually decrease from positive voltage toward 0 V to become negative voltage and gradually decrease. When all of voltages VR, VS, VT become lower than threshold voltage VTHn, timing control circuit 200 raises control signal X1 to "H" level (time t3). When control signal X1 is raised to "H" level, balance control circuit 66A stops the second operation and performs the first operation, so that signal Y1 is raised to "H" level and signal Y2 is lowered to "L" level.

Subsequently, the first and second operations are alternately performed similarly. When output signal DT of determiner 65 is lowered to "L" level that is the inactive level, the first and second operations are stopped, and signals X1, X2, and Y1 to Y4 are brought to "L" level (time t6).

FIGS. 27(A) to 27(F) are time charts illustrating the operation of control unit 53A when Ep<En. When output signal DT of determiner 65 (FIG. 25) is brought to "H" level, balance control circuit 66A is activated. Since Ep<En, balance control circuit 66A starts the third operation and raises signal Y3 to "H" level.

When signal Y3 is raised to "H" level, timing control circuit 200 raises signal X2 to "H" level. When the third operation is performed, terminal-to-terminal voltages VR, VS, and VT of capacitors 11R, 11S, and 11T gradually decrease.

When all of voltages VR, VS, and VT become lower than threshold voltage VTHn, timing control circuit 200 lowers control signal X2 to "L" level (time t2). When control signal X2 is lowered to "L" level, balance control circuit 66A stops the third operation and performs the fourth operation, so that signal Y3 is lowered to "L" level and signal Y4 is raised to "H" level.

When the fourth operation is performed, terminal-to-terminal voltages VR, VS, and VT of capacitors 11R, 11S, and 11T gradually rise from negative voltage toward 0 V to become positive voltage and gradually rise. When all of voltages VR, VS, and VT exceed threshold voltage VTHp, timing control circuit 200 raises control signal X2 to "H" level (time t3). When control signal X2 is raised to "H" level, balance control circuit 66A stops the fourth operation and performs the third operation, so that signal Y3 is raised to "H" level and signal Y4 is lowered to "L" level.

Subsequently, the third and fourth operations are alternately performed similarly. When output signal DT of determiner 65 is lowered to "L" level that is the inactive level, the third and fourth operations are stopped, and signals X1, X2, Y1 to Y4 are brought to "L" level (time t6).

In the present second embodiment, the execution time of the first to fourth operations can be reduced compared with the first embodiment, and the absolute value of voltage ΔE that is the difference between terminal-to-terminal voltages Ep and En of capacitors C1 and C2 can be quickly reduced.

Third Embodiment

Figure 28:
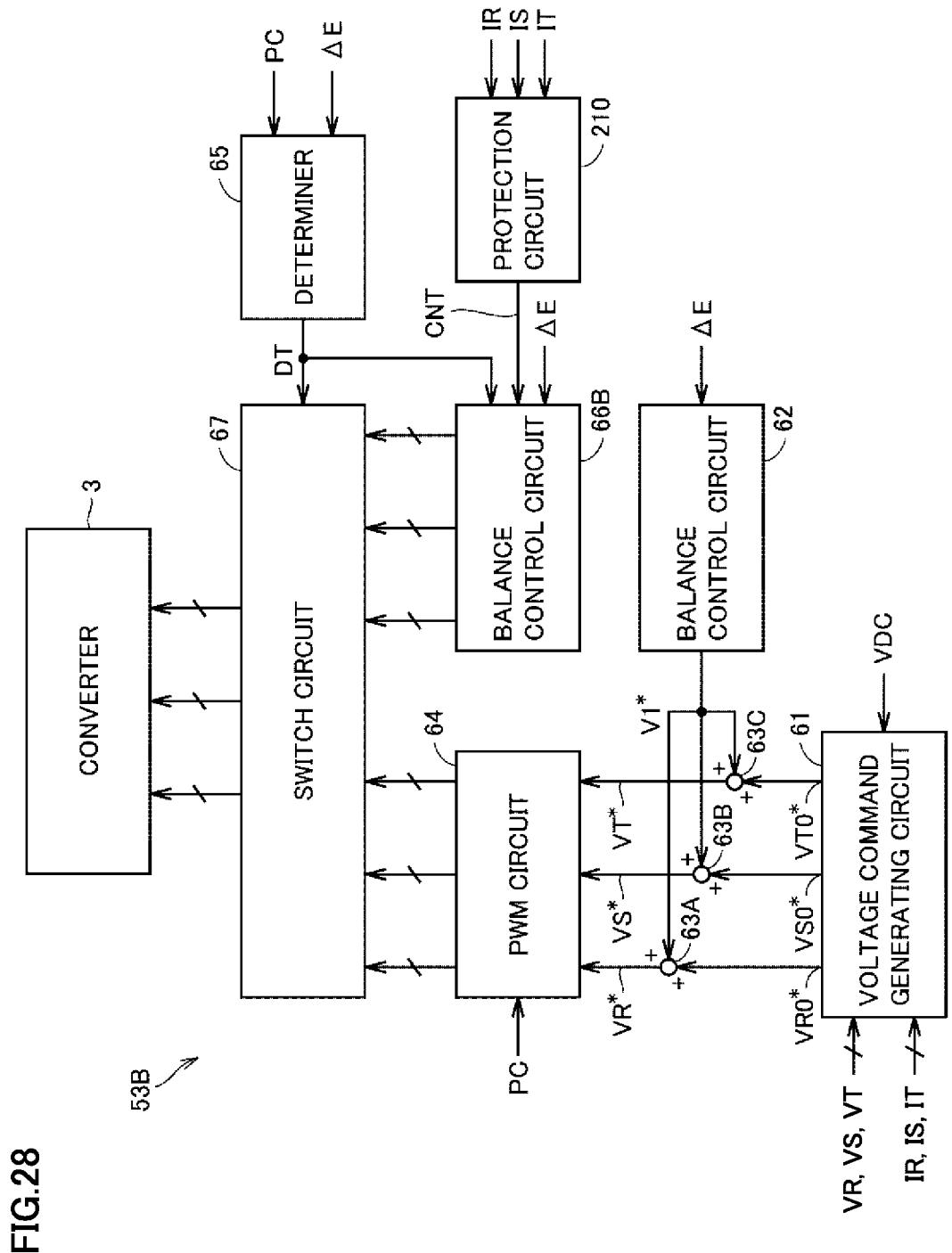
FIG. 28 is a block diagram showing a configuration of a control unit included in the uninterruptible power supply apparatus according to a third embodiment of the present invention.

FIG. 28 is a block diagram showing a configuration of a control unit 53B included in the uninterruptible power supply apparatus according to a third embodiment of the present invention, in comparison with FIG. 6. Referring to FIG. 28, this control unit 53B differs from control unit 53 in that a protection circuit 210 is added and balance control circuit 66 is replaced by a balance control circuit 66B.

Protection circuit 210 generates control signal CNT, based on upper limit value IH and acceptable value IL as well as currents IR, IS, and IT detected by current detectors 32R, 32S, and 32T. Upper limit value IH is larger than the rated current value of IGBT device Q. Acceptable value IL is smaller than the rated current value of IGBT device Q.

When all of the absolute values of currents IR, IS, and IT are smaller than acceptable value IL, control signal CNT is brought to "L" level that is the inactive level.

Even when the absolute values of currents IR, IS, and IT increase and exceed acceptable value IL, control signal CNT3 is kept at "L" level. When the absolute values of currents IR, IS, and IT further increase and at least one of the absolute values of current IR, IS, and IT exceeds upper limit value IH, control signal CNT is raised to "H" level that is the active level.

Even when control signal CNT is brought to "H" level and thereafter the absolute values of currents IR, IS, and IT decrease to be lower than upper limit value IH, control signal CNT is kept at "H" level. When the absolute values of currents IR, IS, and IT further decrease and all of the absolute values of currents IR, IS, and IT become lower than acceptable value IL, control signal CNT is lowered to "L" level that is the inactive level.

When control signal CNT is "L" level that is the inactive level, balance control circuit 66B performs the same operation (FIG. 13 to FIG. 20) as balance control circuit 66 in the first embodiment. Specifically, when Ep>Ec, balance control circuit 66B alternately performs the first operation of turning on and off three sets of IGBT devices Q1 and Q2 at a predetermined frequency fc for a predetermined period of time T1 to discharge capacitor C1 and charge capacitor C2 and the second operation of turning on three sets of IGBT devices Q2 and Q3 for a predetermined period of time T2 to discharge capacitors 11R, 11S, and 11T.

When Ep<Ec, balance control circuit 66B alternately performs the third operation of turning on and off three sets of IGBT devices Q3 and Q4 at a predetermined frequency fc for a predetermined period of time T1 to discharge capacitor C2 and charge capacitor C1 and the fourth operation of turning on three sets of IGBT devices Q2 and Q3 for a predetermined period of time T2 to discharge capacitors 11R, 11S, and 11T.

During execution of the first to fourth operations, when control signal CNT is raised from "L" level that is the inactive level to "H" level that is the active level, balance control circuit 66B turns off three sets of IGBT devices Q1 to Q4 to prevent overcurrent from flowing through converter 3 and damaging converter 3 and temporarily stops the first to fourth operations.

During suspension of the first to fourth operations, when control signal CNT is lowered from "H" level that is the active level to "L" level that is the inactive level, balance control circuit 66C resumes execution of the first to fourth operations.

The present third embodiment therefore achieves the same effect as the first embodiment and in addition can prevent damage to converter 3 due to overcurrent.

Fourth Embodiment

Figures 29, 30:
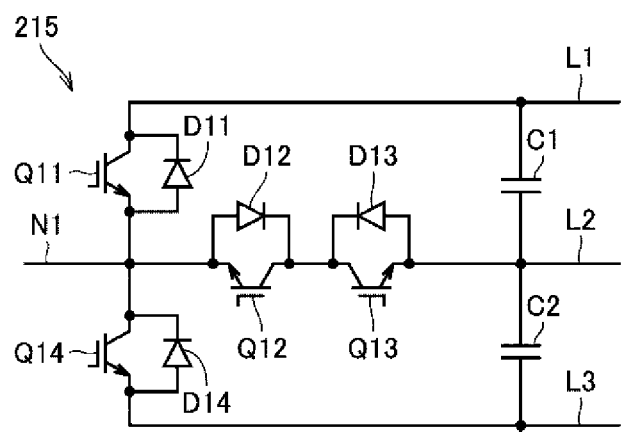
FIG. 29 is a circuit diagram showing the main part of the uninterruptible power supply apparatus according to a fourth embodiment of the present invention.
FIG. 30 is a diagram showing the switching patterns of four IGBT devices included in each phase arm of the converter illustrated in FIG. 29.

FIG. 29 is a circuit diagram showing the main part of the uninterruptible power supply apparatus according to a fourth embodiment of the present invention, in comparison with FIG. 3. Referring to FIG. 29, the fourth embodiment differs from the first embodiment in that each of arms 3R, 3S, 3T, 4U, 4V, and 4W is configured with a three-level circuit 215. Three-level circuit 215 includes IGBT Q11 to Q14 and diodes D11 to D14.

IGBT device Q11 has the collector connected to DC line L1 and the emitter connected to node N1. IGBT devices Q12 and Q13 have the collectors connected to each other and the emitters connected to node N1 and DC line L2, respectively. IGBT device Q14 has the collector connected to node N1 and the emitter connected to DC line L3. Diodes D11 to D14 are connected in anti-parallel with IGBT devices Q11 to Q14, respectively.

When three-level circuit 215 forms R-phase arm 3R of converter 3, node N1 corresponds to input node 3a of converter 3. When three-level circuit 215 forms S-phase arm 3S of converter 3, node N1 corresponds to input node 3b of converter 3. When three-level circuit 215 forms T-phase arm 3T of converter 3, node N1 corresponds to input node 3c of converter 3.

When three-level circuit 215 forms U-phase arm 3U of inverter 4, node N1 corresponds to output node 4a of inverter 4. When three-level circuit 215 forms V-phase arm 3U of inverter 4, node N1 corresponds to output node 4b of inverter 4. When three-level circuit 215 forms W-phase arm 3W of inverter 4, node N1 corresponds to output node 4c of inverter 4.

Figure 31:
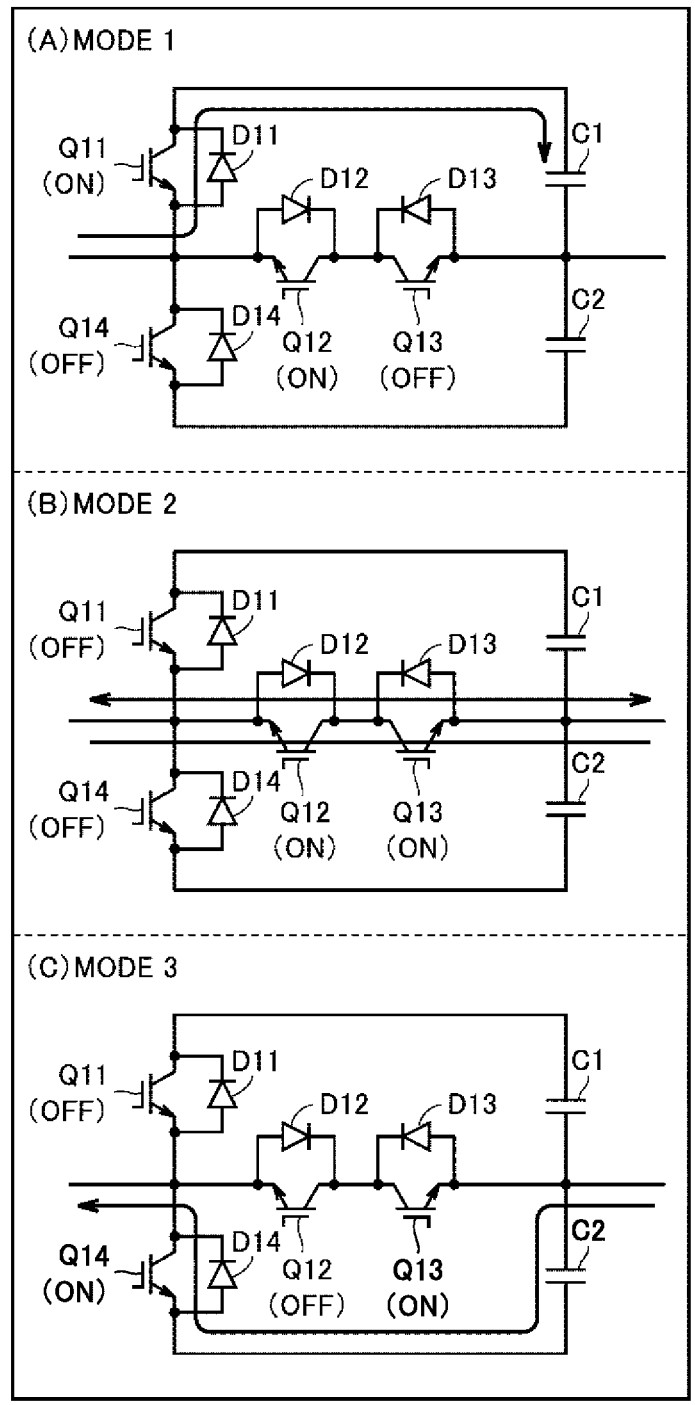
FIG. 31 is a circuit diagram showing the operation of each phase arm in the modes shown in FIG. 30.

As shown in FIG. 10 and FIG. 11, the switching patterns of the IGBT devices of the phase arm have three modes. FIG. 30 is a diagram showing the switching patterns of four IGBT devices Q11 to Q14 shown in FIG. 29, in comparison with FIG. 11. FIGS. 31(A) to 31(C) are circuit diagrams showing the operation of each phase arm in the modes shown in FIG. 30.

FIG. 31(A) shows Mode 1. In Mode 1, IGBT devices Q11 and Q12 turn on, and positive-side smoothing capacitor C1 is charged (or discharged). FIG. 31(B) shows Mode 2. In Mode 2, IGBT devices Q12 and Q13 turn on, and the power storage state of positive-side smoothing capacitor C1 and negative-side smoothing capacitor C2 is not changed so much. FIG. 31(C) shows Mode 3. In Mode 3, IGBT devices Q13 and Q14 turn on, and negative-side smoothing capacitor C2 is charged (or discharged). In FIGS. 31(A) and 31(C), the arrow shows the direction of current flowing during charging. During discharging, current flows in the opposite direction to the arrow. Therefore, three-level circuit 215 is equivalent to switch 98 (FIG. 9).

IGBT device Q11 constitutes a first switching element, IGBT device Q14 constitutes a second switching element, diode D11 constitutes a first rectifying element, diode D14 constitutes a second rectifying element, and IGBT devices Q12 and Q13 and diodes D12 and D13 constitute an AC switch.

In a power failure of commercial AC power supply 41, when the absolute value of voltage ΔE=Ep−En that is the difference between terminal-to-terminal voltages Ep and En of capacitors C1 and C2 exceeds predetermined threshold voltage ETH, IGBT devices Q11 to Q14 are controlled by control signals φ1 to φ4, respectively.

The other configuration and operation is similar to the first embodiment and a description thereof is not repeated. The present fourth embodiment achieves the same effect as the first embodiment.

The embodiments disclosed here should be understood as being illustrative in all respects and should not be construed as being limitative. The present invention is shown not in the foregoing description but in the claims, and it is intended that all modifications that come within the meaning and range of equivalence to the claims are embraced here.

REFERENCE SIGNS LIST

U1, U2 uninterruptible power supply apparatus, 1, 98 switch, 2 input filter, 3 converter, 3R R-phase arm, 3S S-phase arm, 3T T-phase arm, 4 inverter, 4U U-phase arm, 4V V-phase arm, 4W W-phase arm, 5 output filter, 6 DC voltage converter, B1 storage battery, 10, 10A, 10B control device, 11, 11R, 11S, 11T, C1, C2, 19, 19U, 19V, 19W capacitor, 12, 12R, 12S, 12T, 18, 18U, 18V, 18W, 22, 22N, 22P reactor, L1 to L3 DC line, L4 neutral line, 21 semiconductor switch, 31, 34, 35, 36 voltage detector, 32, 32R, 32S, 32T, 37 current detector, 33 power failure detector, 41 commercial AC power supply, 42 load, 43 transformer, 44U, 44V, 44W primary winding, 45U, 45V, 45W secondary winding, 46 load body, Q1R to Q4R, Q1S to Q4S, Q1T to Q4T, Q1U to Q4U, Q1V to Q4V, Q1W to Q4W, Q1D to Q4D, Q11 to Q14 IGBT device, D1R to D6R, D1S to D6S, D1T to D6T, D1U to D6U, D1V to D6V, D1W to D6W, D1D to D4D, D11 to D14, 98a, 98b diode, 51, 63A to 63C, 78A to 78C, 83A adder, 52, 72, 76A to 76C, 83B, 92, 94 subtractor, 53, 53A, 53B, 54, 55 control unit, 61, 81 voltage command generating circuit, 62, 66, 66A, 66B, 82 balance control circuit, 65 determiner, 64, 85 PWM circuit, 67 switch circuit, 71, 91 reference voltage generating circuit, 73 DC voltage control circuit, 74 sine wave generating circuit, 75A to 75C multiplier, 77, 95 current control circuit, 93 voltage control circuit, 200 timing control circuit, 210 protection circuit, 215 three-level circuit.

The invention claimed is:
1. An uninterruptible power supply apparatus comprising:
first to third DC lines;
a first capacitor connected between the first and second DC lines;
a second capacitor connected between the second and third DC lines;
a neutral line connected to a neutral terminal of a three-phase four-wire AC power supply, the second DC line, and a neutral terminal of a three-phase four-wire load;
a switch disposed corresponding to a phase of the AC power supply, having a first terminal receiving AC voltage of a corresponding phase supplied from the AC power supply, turned on in a sound state of the AC power supply, and turned off in a power failure of the AC power supply;
an AC input filter including a third capacitor connected between a second terminal of the switch and the neutral line, and a reactor having a third terminal connected to the second terminal of the switch;
a first converter connected between a fourth terminal of the reactor and the first to third DC lines, and including a first multi-level circuit that converts AC voltage and first to third DC voltages, the first converter being configured to convert AC power from the AC power supply to DC power and supply the DC power to the first to third DC lines in the sound state of the AC power supply;
a DC voltage converter connected between a DC power supply source and the first to third DC lines, and including a second multi-level circuit that converts a fourth DC voltage supplied from the DC power supply source and the first to third DC voltages, the DC voltage converter being configured to supply DC power from the DC power supply source to the first to third DC lines in the power failure of the AC power supply;
an inverter disposed between the first to third DC lines and the load, and including a third multi-level circuit that converts the first to third DC voltages and AC voltage, the inverter being configured to convert DC power supplied from the first converter and the DC voltage converter to AC power and supply the AC power to the load;
first and second voltage detectors that detect terminal-to-terminal voltages of the first and second capacitors, respectively;
a computing circuit that obtains a first voltage that is a sum of the terminal-to-terminal voltages of the first and second capacitors, and a second voltage that is a difference between the terminal-to-terminal voltages of the first and second capacitors, based on detection results of the first and second voltage detectors;
a first control circuit that controls the first converter such that the first voltage becomes a first reference voltage and the second voltage is removed, in the sound state of the AC power supply, stops the first converter in a first case where an absolute value of the second voltage is smaller than a first threshold voltage, in the power failure of the AC power supply, and controls the first converter to reduce the second voltage in a second case where the absolute value of the second voltage is larger than the first threshold voltage; and
a second control circuit that controls the DC voltage converter such that the first voltage becomes the first reference voltage and the second voltage is removed, in the power failure of the AC power supply,
the first multi-level circuit including
a first switching element connected between the first DC line and the other terminal of the reactor,
a first rectifying element connected in a forward direction between the other terminal of the reactor and the first DC line,
an AC switch connected between the other terminal of the reactor and the second DC line,
a second switching element connected between the other terminal of the reactor and the third DC line, and
a second rectifying element connected in a forward direction between the third DC line and the other terminal of the reactor, wherein
in the second case, the first control circuit
turns on and off the first switching element to discharge the first capacitor and charge the second capacitor when the terminal-to-terminal voltage of the first capacitor is larger than the terminal-to-terminal voltage of the second capacitor, and
turns on and off the second switching element to discharge the second capacitor and charge the first capacitor when the terminal-to-terminal voltage of the second capacitor is larger than the terminal-to-terminal voltage of the first capacitor.

2. The uninterruptible power supply apparatus according to claim 1, wherein
in the second case, the first control circuit
alternately performs a first operation of turning on and off the first switching element and a second operation of turning on the AC switch to lower a terminal-to-terminal voltage of the third capacitor, when the terminal-to-terminal voltage of the first capacitor is larger than the terminal-to-terminal voltage of the second capacitor, and
alternately performs a third operation of turning on and off the second switching element and a fourth operation of turning on the AC switch to raise the terminal-to-terminal voltage of the third capacitor, when the terminal-to-terminal voltage of the second capacitor is larger than the terminal-to-terminal voltage of the first capacitor.

3. The uninterruptible power supply apparatus according to claim 2, wherein
in the second case, the first control circuit
in the first operation, turns on and off the first switching element at a predetermined frequency for a predetermined first period of time,
in the second operation, turns on the AC switch for a predetermined second period of time,
in the third operation, turns on and off the second switching element at the predetermined frequency for the predetermined first period of time, and
in the fourth operation, turns on the AC switch for the predetermined second period of time.

4. The uninterruptible power supply apparatus according to claim 2, further comprising a third voltage detector that detects the terminal-to-terminal voltage of the third capacitor, wherein
in the second case, the first control circuit
in the first operation, turns on and off the first switching element at a predetermined frequency and in response to the third voltage exceeding a second threshold voltage having positive polarity, stops the first operation and performs the second operation,
in the second operation, turns on the AC switch and in response to the third voltage becoming lower than a third threshold voltage having negative polarity, stops the second operation and performs the first operation,
in the third operation, turns on and off the second switching element at the predetermined frequency and in response to the third voltage becoming lower than the third threshold voltage, stops the third operation and performs the fourth operation, and
in the fourth operation, turns on the AC switch and in response to the third voltage exceeding the second threshold voltage, stops the fourth operation and performs the third operation.

5. The uninterruptible power supply apparatus according to claim 2, further comprising a current detector that detects current flowing through the reactor, wherein
in the second case, the first control circuit
turns off the first switching element, the second switching element, and the AC switch to stop the first to fourth operations, when current flowing through the reactor exceeds a predetermined upper limit value during execution of the first to fourth operations, and
resumes the first to fourth operations when current flowing through the reactor becomes lower than a predetermined acceptable value.

6. The uninterruptible power supply apparatus according to claim 1, wherein
the first multi-level circuit includes
first and second transistors connected in series between the first DC line and the other terminal of the reactor,
third and fourth transistors connected in series between the other terminal of the reactor and the third DC line,
first, second, third, and fourth diodes connected in anti-parallel with the first, second, third, and fourth transistors, respectively,
a fifth transistor having an anode connected to the second DC line and a cathode connected to a node between the first and second transistors, and
a sixth transistor having an anode connected to a node between the third and fourth transistors and a cathode connected to the second DC line,
the first and second transistors constitute the first switching element,
the first and second diodes constitute the first rectifying element,
the second and third transistors and the second, third, fifth, and sixth diodes constitute the AC switch,
the third and fourth transistors constitute the second switching element, and
the third and fourth diodes constitute the second rectifying element.

7. The uninterruptible power supply apparatus according to claim 1, wherein
the first multi-level circuit includes
a first transistor connected between the first DC line and the other terminal of the reactor,
second and third transistors having first electrodes connected to each other and having second electrodes connected to the other terminal of the reactor and the second DC line, respectively,
a fourth transistor connected between the other terminal of the reactor and the third DC line, and
first, second, third, and fourth diodes connected in anti-parallel with the first, second, third, and fourth transistors, respectively,
the first and fourth transistors constitute the first and second switching elements, respectively,
the first and fourth diodes constitute the first and second rectifying elements, respectively, and
the second and third transistors and the second and third diodes constitute the AC switch.

8. The uninterruptible power supply apparatus according to claim 1, wherein
the DC power supply source is a power storage device that stores DC power,
the second multi-level circuit is configured to convert the fourth DC voltage supplied from the power storage device and first to third DC voltages,
the DC voltage converter stores DC power generated by the first converter into the power storage device in the sound state of the AC power supply and supplies DC power of the power storage device to the first to third DC lines in the power failure of the AC power supply, and
the uninterruptible power supply apparatus further comprises:
a third voltage detector that detects a terminal-to-terminal voltage of the power storage device; and
a third control circuit that controls the DC voltage converter such that a detected value of the third voltage detector becomes a second reference voltage in the sound state of the AC power supply.

\* \* \* \* \*